US010504554B2

(12) United States Patent
Takahashi

(10) Patent No.: US 10,504,554 B2
(45) Date of Patent: Dec. 10, 2019

(54) INFORMATION PROCESSING DEVICE, INFORMATION PROCESSING SYSTEM, AND INFORMATION PROCESSING METHOD

(71) Applicant: SONY CORPORATION, Tokyo (JP)

(72) Inventor: Naoya Takahashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 100 days.

(21) Appl. No.: 15/544,128

(22) PCT Filed: Nov. 12, 2015

(86) PCT No.: PCT/JP2015/081867
§ 371 (c)(1),
(2) Date: Jul. 17, 2017

(87) PCT Pub. No.: WO2016/125362
PCT Pub. Date: Aug. 11, 2016

(65) Prior Publication Data
US 2018/0268866 A1 Sep. 20, 2018

(30) Foreign Application Priority Data
Feb. 3, 2015 (JP) ................................ 2015-019554

(51) Int. Cl.
*G11B 27/00* (2006.01)
*H04N 21/439* (2011.01)
(Continued)

(52) U.S. Cl.
CPC .......... *G11B 27/005* (2013.01); *G11B 27/031* (2013.01); *H04N 5/783* (2013.01);
(Continued)

(58) Field of Classification Search
CPC ........ G11B 27/005; G11B 20/10; H04N 5/76; H04N 5/93; H04N 21/439
See application file for complete search history.

(56) References Cited

U.S. PATENT DOCUMENTS

2005/0149557 A1* 7/2005 Moriya ............. G06F 17/30802
2009/0148133 A1* 6/2009 Nomura ............... G11B 27/105
386/248
(Continued)

FOREIGN PATENT DOCUMENTS

JP 08-098146 A 4/1996
JP 2002-084505 A 3/2002
(Continued)

OTHER PUBLICATIONS

International Search Report and Written Opinion of PCT Application No. PCT/JP2015/081867, dated Dec. 22, 2015, 02 pages of English Translation and 07 pages of ISRWO.

*Primary Examiner* — Mishawn N. Hunter
(74) *Attorney, Agent, or Firm* — Chip Law Group

(57) ABSTRACT

An information processing device including a video generation unit that generates a fast reproduction video from a video part of an input moving image, a sound generation unit that generates a shortened sound using a portion of a sound part of the moving image, and a synthesizing unit that synthesizes the fast reproduction video generated by the video generation unit and the shortened sound generated by the sound generation unit and generate a fast reproduction moving image.

13 Claims, 16 Drawing Sheets

(51) Int. Cl.

| | |
|---|---|
| ***G11B 27/031*** | (2006.01) |
| ***H04N 5/783*** | (2006.01) |
| ***H04N 9/802*** | (2006.01) |
| ***H04N 21/8549*** | (2011.01) |

(52) U.S. Cl.

CPC ........... *H04N 9/802* (2013.01); *H04N 21/439* (2013.01); *H04N 21/8549* (2013.01)

(56) References Cited

U.S. PATENT DOCUMENTS

| | | | | |
|---|---|---|---|---|
| 2012/0033949 | A1* | 2/2012 | Lu | G11B 27/034 386/285 |
| 2012/0089393 | A1* | 4/2012 | Tanaka | G10L 25/87 704/231 |
| 2012/0123780 | A1* | 5/2012 | Gao | G06K 9/00751 704/245 |
| 2013/0247098 | A1* | 9/2013 | Ohya | H04N 21/435 725/38 |

FOREIGN PATENT DOCUMENTS

| | | | |
|---|---|---|---|
| JP | 2005-204003 | A | 7/2005 |
| JP | 2005-286881 | A | 10/2005 |
| JP | 2006-121570 | A | 5/2006 |
| JP | 2008-118688 | A | 5/2008 |

* cited by examiner 600
650
660
time
time
time
0
631
632
634
642

START S110
S202
i = 1
S204
j = 1
D
S206
IS THERE EXTRACTED SOUND IN SECTION $d_i$?
YES
NO
S214
EVENT SOUND?
YES
NO
A
S220
IS THERE EXTRACTED SOUND IN SECTION $d_{i+j}$? or IS THERE CHANGE IN CLASS OF ENVIRONMENTAL SOUND?
YES
NO
B
S222
j++
S208
IS THERE EXTRACTED SOUND IN SECTION $d_{i+j}$?
YES
NO
C
S210
j++

730
IMAGE DB
200
VIDEO GENERATION UNIT
710
720
313
ENVIRONMENTAL SOUND SECTION DIVISION UNIT
740
ENVIRONMENTAL SOUND DB
320
EXTRACTION UNIT
750
EXTRACTION RULE DB
720

INFORMATION PROCESSING DEVICE, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2015/081867 filed on Nov. 12, 2015, which claims priority benefit of Japanese Patent Application No. JP 2015-019554 filed in the Japan Patent Office on Feb. 3, 2015. Each of the above-referenced applications is hereby incorporated herein by reference in its entirety.

TECHNICAL FIELD

The present disclosure relates to an information processing device, an information processing system, an information processing method, and a program.

BACKGROUND ART

Cameras of such types as life-log cameras or action cameras have been widely used in the fields of sports and the like in recent years. Since such cameras are mostly used in long-time continuous photographing and use a monotonous composition, it is hard to fully appreciate captured moving images of the cameras without image processing. For this reason, for example, a technology for generating a fast reproduction moving image by reproducing a captured moving image at a high speed to rearrange the image to be short has gained attention. Such fast reproduction moving images include, for example, so-called time-lapse moving images, and hyper-lapse moving images that are first-person time-lapse moving images (which are captured from the point of view of a photographer himself or herself).

With respect to videos, for example, technologies of suppressing significant camera shake appearing in fast reproduction have been developed. Meanwhile, with respect to sound, for example, technologies of performing fast reproduction while suppressing distortion of pitch and tone using speed control in which waveforms are extended/contracted or thinned out have been developed. In the speed control technology, however, there are cases in which pitch and tone are severely distorted or a speaking sound of a person becomes fragmented so it becomes hardly-understandable unnatural sound at reproduction speeds applied to fast reproduction moving images (e.g., a quad speed and higher). For this reason, there is demand for a technology for reproducing natural sound in fast reproduction moving images.

For example, Patent Literature 1 described below discloses a technology of dividing input sound of a person into utterance sections and non-utterance sections and reproducing the non-utterance sections at a higher speed than the utterance sections.

CITATION LIST

Patent Literature

Patent Literature 1: JP 2008-118688A

DISCLOSURE OF INVENTION

Technical Problem

However, in the technology disclosed in Patent Literature 1 described above, it is hard to reproduce utterance sections at a high speed. Thus, for example, when reproducing an utterance section at a higher speed is attempted, its sound becomes mostly unnatural. Therefore, the present disclosure proposes a novel and improved information processing device, information processing system, information processing method and program which enable sound to be naturally reproduced in fast reproduction moving images.

Solution to Problem

According to the present disclosure, there is provided an information processing device including: a video generation unit configured to generate a fast reproduction video from a video part of an input moving image; a sound generation unit configured to generate a shortened sound using a part of a sound part of the moving image; and a synthesizing unit configured to synthesize the fast reproduction video generated by the video generation unit and the shortened sound generated by the sound generation unit and generate a fast reproduction moving image.

Further, according to the present disclosure, there is provided an information processing system including: a video generation unit configured to generate a fast reproduction video from a video part of an input moving image; a sound generation unit configured to generate a shortened sound using a part of a sound part of the moving image; and a synthesizing unit configured to synthesize the fast reproduction video generated by the video generation unit and the shortened sound generated by the sound generation unit and generate a fast reproduction moving image.

Further, according to the present disclosure, there is provided an information processing method including: generating a fast reproduction video from a video part of an input moving image; generating a shortened sound using a part of a sound part of the moving image; and synthesizing, by a processor, the generated fast reproduction video and the shortened sound and generating a fast reproduction moving image.

Further, according to the present disclosure, there is provided a program causing a computer to function as: a video generation unit configured to generate a fast reproduction video from a video part of an input moving image; a sound generation unit configured to generate a shortened sound using a part of a sound part of the moving image; and a synthesizing unit configured to synthesize the fast reproduction video generated by the video generation unit and the shortened sound generated by the sound generation unit and generate a fast reproduction moving image.

Advantageous Effects of Invention

According to the present disclosure described above, it is possible to reproduce sound more naturally in fast reproduction moving images. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
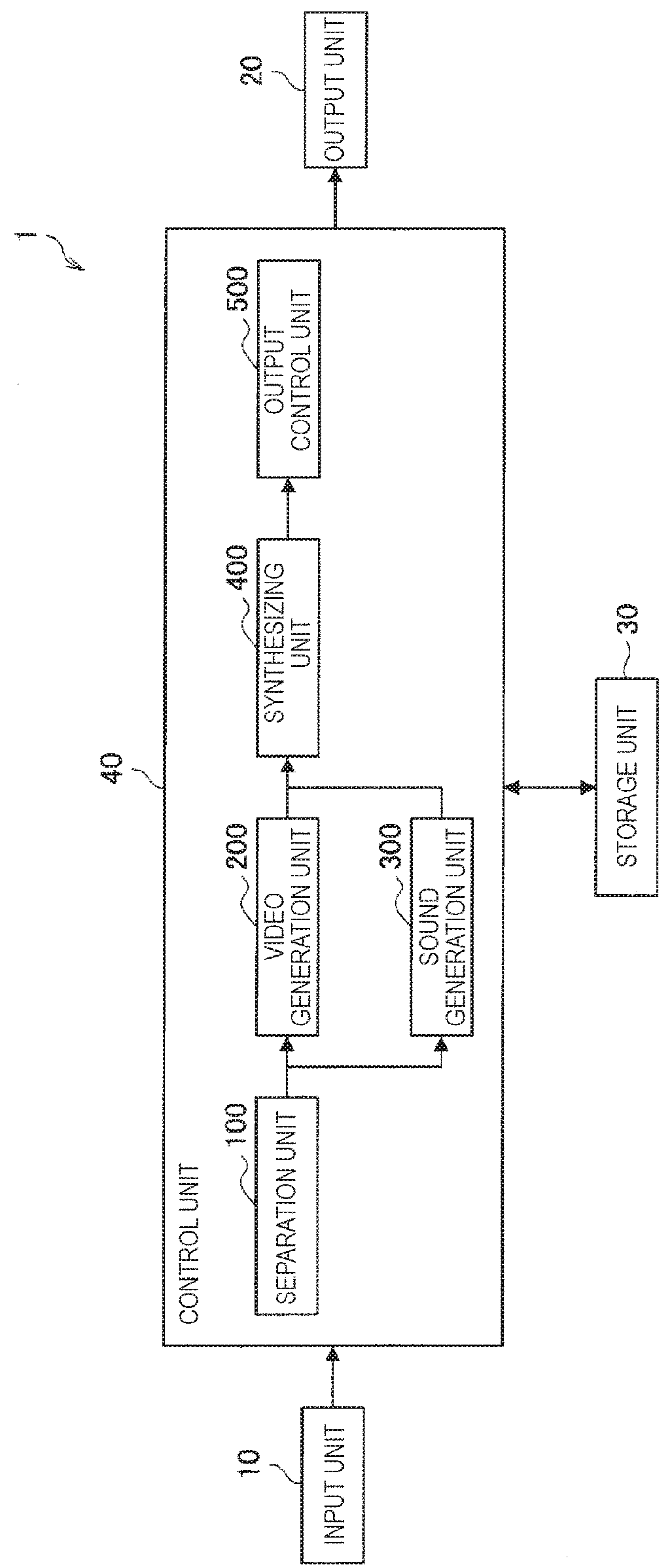
FIG. 1 is a block diagram illustrating a logical configuration example of a moving image generation device according to the present embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Overview
2. First Embodiment
2.1. Configuration example
2.2. Operational process example
3. Second Embodiment
4. Third Embodiment
5. Fourth Embodiment
6. Hardware configuration example
7. Conclusion «1. Overview»

First, an overview of a moving image generation device according to an embodiment of the present disclosure will be described.

The moving image generation device according to the present embodiment generates a fast reproduction moving image obtained by reproducing an input moving image at a high speed. At this time, the moving image generation device can add natural sound having neither distortion nor a fragmentary impression that matches a scene or an event of a video to a fast reproduction moving image. Note that, in the present specification, the entire sound is also referred to as sound, the sound of a person is referred to as utterance sounds, and sound other than utterance sounds is referred to environmental sounds. However, sound recognition refers to a technology of recognizing content of an utterance. In addition, a moving image is assumed to include sound and a video (image). Further, sound for a fast reproduction moving image is also referred to as a shortened sound, and a video for a fast reproduction moving image is referred to as a fast reproduction video.

The moving image generation device according to the present embodiment will be compared to the technology disclosed in Patent Literature 1 which will be used a comparative example below.

In the comparative example, a non-utterance section is reproduced at a higher speed than an utterance section. Thus, an unnecessary restriction that it is desirable to change a reproduction speed of a video in accordance with utterance or non-utterance is imposed on the comparative example. In addition, when a reproduction speed of only the sound is changed, synchronization deviation from a video occurs and thus it is difficult to match the video and the sound. Furthermore, there is a possibility of the sound of a non-utterance section being distorted during fast reproduction and thus a solution such as muting a video is necessary.

Here, when sound is reproduced at about quadruple speed or higher, for example, it is hard to understand the content of an utterance included in the sound. However, it is considered that there are few viewers of fast reproduction moving images who try to fully understand the content of utterances. For example, it is considered to be sufficient for viewers to understand a situation or ambience of a video or to hear the content of very short utterances.

Thus, for example, a technique of separating out and extracting only environmental sounds and adding the sounds to a fast reproduction moving image has been considered. JP 2014-139658A, for example, discloses a technology of extracting environmental sounds from sound signals. In the technology, however, it is difficult to extract sounds not being oriented to a center, and there is a possibility of tone deteriorating. Thus, although the technology is considered to be applicable, it is difficult to enable sound to be naturally reproduced in a fast reproduction moving image.

Therefore, the moving image generation device according to the present embodiment has been created taking the above circumstances into consideration. The moving image generation device according to the present embodiment generates a shortened sound using a part of a sound part of a moving image. More specifically, the moving image generation device according to the present embodiment extracts a part of a sound part of a moving image and reproduces an extracted sound at a timing at which the sound is synchronized with a video part being reproduced at a high speed.

The overview of the moving image generation device according to an embodiment of the present disclosure has been described above. Details of each embodiment will be described below.

«2. First Embodiment»

First, a first embodiment will be described with reference to FIGS. 1 to 10. The present embodiment is an embodiment in which a shortened sound is generated on the basis of a piece of original input sound.

<2.1. Configuration Example>

(A) Overall Configuration Example

FIG. 1 is a block diagram illustrating a logical configuration example of a moving image generation device according to the present embodiment. As illustrated in FIG. 1, the moving image generation device 1 includes an input unit 10, an output unit 20, a storage unit 30, and a control unit 40.

(A.1) Input unit 10

The input unit 10 has a function of receiving an input of a moving image to be processed by the moving image generation device 1. For example, the input unit 10 may be realized by a camera that captures moving images and a microphone. In addition, the input unit 10 may be a wired or wireless interface that receives an input of a moving image from another device.

(A.2) Output Unit 20

The output unit 20 has a function of outputting a fast reproduction moving image generated by the control unit 40. For example, the output unit 20 may be realized by a display device that outputs a moving image and a sound output device. In addition, the output unit 20 may be a wired or wireless interface that outputs a fast reproduction moving image to another device.

(A.3) Storage Unit 30

The storage unit 30 is a unit for recording and reproducing data with respect to a predetermined recording medium. For example, the storage unit 30 may store a generated fast reproduction moving image or sound data and video data being processed to generate a fast reproduction moving image.

(A.4) Control Unit 40

The control unit 40 functions as an arithmetic processing device and a control device, and controls overall operations performed in the moving image generation device 1 in accordance with various programs. As illustrated in FIG. 1, the control unit 40 functions as a separation unit 100, a video generation unit 200, a sound generation unit 300, a synthesizing unit 400, and an output control unit 500.

(A.4.1) Separation Unit 100

The separation unit 100 has a function of separating an input moving image into a video part and a sound part. The separation unit 100 outputs the video part to the video generation unit 200 and the sound part to the sound generation unit 300.

(A.4.2) Video Generation Unit 200

The video generation unit 200 has a function of generating a fast reproduction video from the video part of the input moving image. For example, the video generation unit 200 generates a fast reproduction video by converting the video separated out by the separation unit 100 into a video with a predetermined reproduction speed. The reproduction speed may be fixed, or may change in accordance with time. The video generation unit 200 may perform a stabilization process (stabilizing process) such as correction of camera shake. As the stabilization process, for example, the technology disclosed in JP 2012-257080A is applicable.

(A.4.3) Sound Generation Unit 300

The sound generation unit 300 has a function of generating a shortened sound using a part of the sound part of the input moving image. For example, the sound generation unit 300 generates a shortened sound by shortening a reproduction time of the sound of some sections of the sound separated out by the separation unit 100 (original sound) in accordance with a reproduction speed applied by the video generation unit 200. Note that the shortened sound is the sound obtained by connecting pieces of sound of some sections extracted from the original sound and thereby shortening a reproduction time thereof. The extracted pieces of sound may be connected by speeding up, equalizing, or lowering their reproduction speeds. In addition, the shortened sound may also include sections with different reproduction speeds. A functional configuration of the sound generation unit 300 will be described below in more detail.

(A.4.4) Synthesizing Unit 400

The synthesizing unit 400 has a function of synthesizing the fast reproduction video generated by the video generation unit 200 and the shortened sound generated by the sound generation unit 300 and thereby generating a fast reproduction moving image.

(A.4.5) Output Control Unit 500

The output control unit 500 has a function of controlling the output unit 20 such that the fast reproduction moving image generated by the synthesizing unit 400 is output. The output control unit 500 may cause the storage unit 30 to store the fast reproduction moving image.

The overall configuration example of the moving image generation device 1 has been described above. Next, the function of the sound generation unit 300 will be described in detail with reference to FIGS. 2 to 7.

(B) Configuration Example of Sound Generation Unit 300

Figure 2:
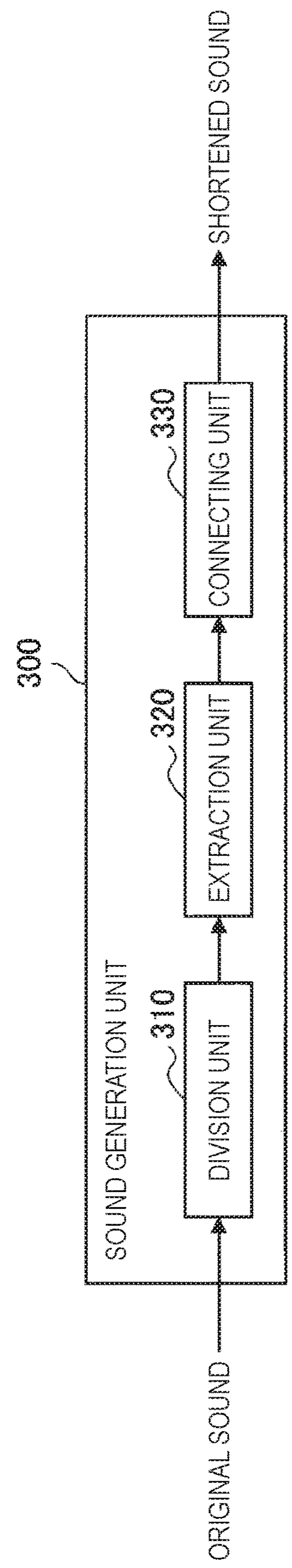
FIG. 2 is a block diagram illustrating a logical configuration example of a sound generation unit according to the present embodiment.

FIG. 2 is a block diagram illustrating a logical configuration example of the sound generation unit 300 according to the present embodiment. The sound generation unit 300 generates a shortened sound from the original sound. As illustrated in FIG. 2, the sound generation unit 300 functions as a division unit 310, an extraction unit 320, and a connecting unit 330.

(B.1) Division Unit 310

The division unit 310 has a function of dividing a sound part of a moving image into one or more sections. For example, the division unit 310 divides sound into an utterance section in which utterance sounds are included and a non-utterance section in which only environmental sounds are included, or divides a sound into sections which are scenes. The sound of each separate section is also referred to as a sound segment below. A function of the division unit 310 will be described in detail below with reference to FIGS. 3 and 4.

Figure 3:
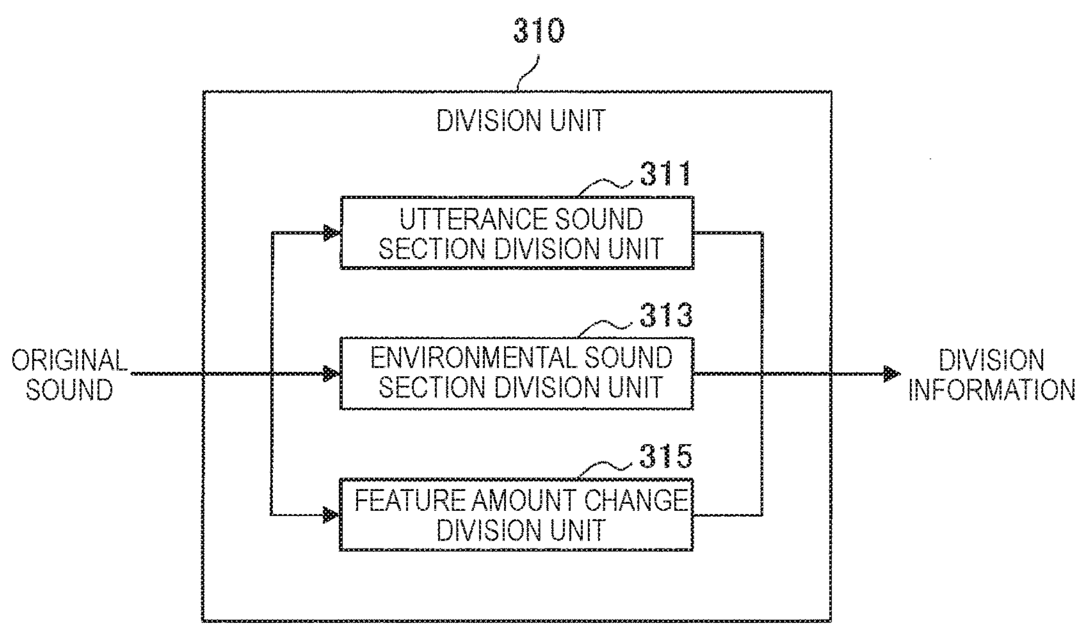
FIG. 3 is a block diagram illustrating a logical configuration example of a division unit according to the present embodiment.

FIG. 3 is a block diagram illustrating a logical configuration example of the division unit 310 according to the present embodiment. The division unit 310 divides the original sound and outputs division information that is information indicating division points. As illustrated in FIG. 3, the division unit 310 functions as an utterance sound section division unit 311, an environmental sound section division unit 313, and a feature amount change division unit 315.

(B.1.1) Utterance Sound Section Division Unit 311

The utterance sound section division unit 311 has a function of dividing sound into utterance sections in which utterance sounds are included and non-utterance sections in which utterance sounds are not included by detecting utterance sounds. For example, the utterance sound section division unit 311 may perform voice activity detection (VAD). As an example of VAD, for example, a method of setting a section in which an energy of input sound exceeds a threshold value as an utterance section and setting other sections as a non-utterance section may be employed. Also, a method of setting a section in which a value R obtained by normalizing the integral over a short time (T1) of the energy of the input sound with respect to the integral over a long time (T2; T1<<T2) as shown in Expression 1 below exceeds a pre-set threshold value th as an utterance section may be employed.

[Math. 1]

$$R = \frac{\int_{t-T1}^{t} x(t')^2 dt'}{\int_{t-T2}^{t} x(t')^2 dt'} \qquad \text{Expression 1}$$

$$\begin{cases} R \geq th \Rightarrow \text{Utterance section} \\ R < th \Rightarrow \text{Non-utterane section} \end{cases}$$

In addition, another method may be employed in order to improve robustness. For example, a method in which the whiteness of a spectrum or an SNR for a short-time is considered, a method disclosed in JP 2007-328228A in which the periodicity of waveforms is considered, or a method disclosed in JP 2012-150237A in which an incoming direction of a sound source is considered may be employed.

The utterance sound section division unit 311 may perform sound recognition with respect to an utterance section and divide the utterance section more finely. For example, the utterance sound section division unit 311 may divide the utterance section into units of sentences or words. As a sound recognition method, for example, a modeling method using a hidden Markov model in which a mixed normal distribution having Mel-Frequency Cepstrum Coefficients (MFCC) and the like as feature amounts is generated and the generated mixed normal distribution is set as an output probability may also be employed.

(B.1.2) Environmental Sound Section Division Unit 313

The environmental sound section division unit 313 has a function of dividing a sound part of a moving image into sections of scenes of the moving image with respect to sound other than utterance sounds. Accordingly, the sound generation unit 300 can generate a shortened sound each corresponding to each scene included in a fast reproduction video. For example, the environmental sound section division unit 313 first classifies sections in which environmental sounds are included into environmental sounds of scenes (classes) such as environmental sounds of a main street, environmental sounds of a backstreet, environmental sounds of a nature park, and environmental sounds from around a train. Further, the environmental sound section division unit 313 may detect sound with little steadiness, for example, a sound of a firework, a single burst sound of a car horn, a sound of a car passing by, or a single striking sound and the classified environmental sounds of each class may be further classified. Then, the utterance sound section division unit 311 divides sound using a time point at which a classification class changes and a starting point and an ending point of sound with little steadiness as division points.

Figure 4:
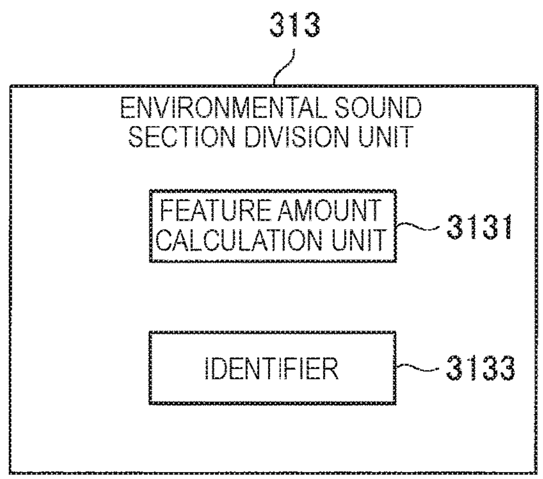
FIG. 4 is a block diagram illustrating a logical configuration example of an environmental sound section division unit according to the present embodiment.

FIG. 4 is a block diagram illustrating a logical configuration example of the environmental sound section division unit 313 according to the present embodiment. As illustrated in FIG. 4, the environmental sound section division unit 313 functions as a feature amount calculation unit 3131 and an identifier 3133.

The feature amount calculation unit 3131 has a function of calculating a feature amount of an environmental sound. Since environmental sounds exhibit wider variation than utterance sounds, the feature amount calculation unit 3131 may calculate a variety of feature amounts and thereby improve accuracy in identifying an environmental sound. As feature amounts, for example, an energy, a zerocrossing, a spectral envelope, a spectral flux, a spectral centroid, MFCC, matching pursuit (MP), subband PCA, or the like can be employed.

The identifier 3133 has a function of identifying a class from a feature amount. As the identifier 3133, for example, a linear determinator, a support vector machine, a neural network, a Gaussian mixture model (GMM), or the like may be employed. The identifier 3133 is assumed to have already finished learning using training data.

(B.1.3) Feature Amount Change Division Unit 315

The feature amount change division unit 315 has a function of dividing a sound part of a moving image at a time point at which a feature amount changes. The feature amount change division unit 315 can function, for example, in corporation with the environmental sound section division unit 313 or instead of the environmental sound section division unit 313. As a feature amount, for example, a feature amount calculated by the feature amount calculation unit 3131 may be employed likewise. Since the feature amount change division unit 315 does not require an identifying process, the feature amount change division unit can perform division more easily than the environmental sound section division unit 313. In addition, since the feature amount change division unit 315 does not require learning, the feature amount change division unit can more easily cope with unknown scenes than the environmental sound section division unit 313. For example, the feature amount change division unit 315 can monitor a short-time average of the energy of whole sound, an energy of each band, a spectral flux, or the like for each feature amount and divide sections at a time point at which an amount of change of the feature amount exceeds a threshold value.

The configuration example of the division unit 310 has been described above. Note that the division unit 310 may have, for example, at least one or some of the utterance sound section division unit 311, the environmental sound section division unit 313, and the feature amount change division unit 315. The description will return to the sound generation unit 300 below.

(B.2) Extraction Unit 320

The extraction unit 320 has a function of extracting one or more of sound segments from a part of a sound part of an input moving image. For example, the extraction unit 320 may determine a section to be thinned out among sections obtained by division of the division unit 310 and a section to be extracted as a section to be used for a shortened sound. Since the sound of some sections of the original sound is used for a shortened sound, a length of sound to be used is shortened in comparison to a case in which the whole sound is used for a shortened sound. Accordingly, a degree of fast reproduction becomes lower, and thus awkwardness caused by fast reproduction is reduced. A variety of extraction methods used by the extraction unit 320 may be conceived.

For example, the extraction unit 320 may first extract sound segments from non-utterance sections (environmental sounds). At this time, the extraction unit 320 may extract one or more sound segments from each of sections of scenes obtained by division of the division unit 310. Accordingly, the extraction unit 320 can extract sound segments corresponding to each of scenes included in a fast reproduction video. Thus, the moving image generation device 1 can generate a fast reproduction moving image including the sound segments corresponding to scenes. Thereby, a viewer can easily understand a situation or an ambience of the video.

In addition, the extraction unit 320 may first extract an event sound. An event sound refers to a sound corresponding to an event that has occurred during capture of a moving image. An event sound may be, for example, a short utterance sound such as "wow!" or "we are arriving at OO" among utterance sounds. The extraction unit 320, for example, may extract an event sound from an utterance section when the sound of a registered word has been recognized with reference to an extraction rule DB in which words to be extracted are registered. Accordingly, a viewer can hear the content of a short utterance. In addition, an event sound may be a sudden sound such as a sound of a firework, a single burst sound of a car horn, a sound of a car passing by, a single striking sound, or a bursting sound among environmental sounds. The extraction unit 320 may extract an event sound from non-utterance sections when a registered environmental sound has been recognized, for example, with reference to an environmental sound DB in which environmental sounds to be extracted are registered. An extraction process of the extraction unit 320 will be described below in detail with reference to FIG. 5.

Figure 5:
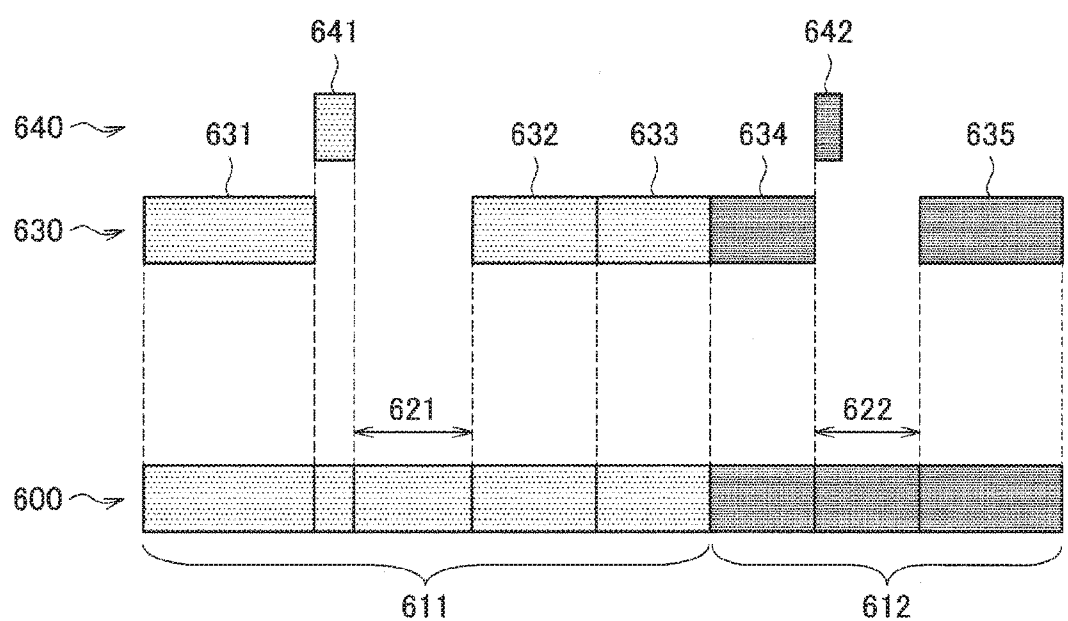
FIG. 5 is a diagram for describing an example of an extraction process performed by an extraction unit according to the present embodiment.

FIG. 5 is a diagram for describing an example of an extraction process performed by the extraction unit 320 according to the present embodiment. For example, an original sound 600 is assumed to be separated into the sound of two scenes that are a scene 611 and a scene 612. In addition, the original sound 600 is assumed to include utterance sections 621 and 622. Note that section lines of the original sound 600 are assumed to mean division points set by the division unit 310. First, the extraction unit 320 extracts an environmental sound 630 (including reference numerals 631 to 635) that is a non-utterance section. Then, the extraction unit 320 extracts an event sound 640. An event sound 641 is a sudden environmental sound of a firework or the like. An event sound 642 is a short utterance sound such as "we are arriving at OO."

Note that the extraction unit 320 may perform extraction in accordance with content of the above-described sounds and, for example, a rate of a reproduction speed.

(B.3) Connecting Unit 330

The connecting unit 330 has a function of generating a shortened sound by connecting each of sound segments extracted by the extraction unit 320.

For example, the connecting unit 330 may connect the sound segments to each other in an overlapping manner. Accordingly, discontinuation of a shortened sound is prevented. In addition, the connecting unit 330 may apply various acoustic effects to overlapped parts of the sound segments. For example, the connecting unit 330 may apply cross-fade to overlapping parts of the sound segments. Accordingly, discontinuity and radical change in sound at overlapping parts are prevented, and thus awkwardness of sound reproduced in a fast reproduction moving image is reduced.

For example, the connecting unit 330 may generate a shortened sound by disposing each of sound segments extracted by the extraction unit 320 at positions corresponding to a fast reproduction video and connecting the sounds. Accordingly, the sound generation unit 300 can generate a shortened sound synchronized with (co-related to) the fast reproduction video, and thus awkwardness of sound reproduced in a fast reproduction moving image is reduced. In a fast reproduction moving image, for example, a rough sound of a car is reproduced in a video of a main street with heavy traffic and a peaceful sound of a river is reproduced in a video of peaceful riverside, and thus it is possible to prevent, for example, a peaceful sound of a river from being reproduced in a video of a main street with heavy traffic.

More specifically, the connecting unit 330 may dispose a reproduction start position of a sound segment at a position of a fast reproduction video corresponding to a starting point of the sound segment of an input moving image. In other words, the connecting unit 330 matches a reproduction start position of a fast reproduction video of a video section from which the sound segment of the input moving image has been extracted with a reproduction start position of the sound segment. Accordingly, a starting point of a video matches a starting point of a sound corresponding to the video and therefore synchronization thereof is achieved.

In addition, the connecting unit 330 may speed up and connect sound segments to each other. For example, when a length of a certain sound segment is longer than a time period before when a next sound segment is to be disposed, the connecting unit 330 may speed up the sound segment in a range in which the tone of the sound segment is not radically changed (e.g., within about 1.5 times the speed of the sound segment). Also, the connecting unit 330 may cut out a sound segment in accordance with a period to a sound segment to be disposed next. Accordingly, a length of the sound segment can match a length of the fast reproduction moving image. In addition, when a length of a certain sound segment is shorter than a period to a sound segment to be disposed next, the connecting unit 330 may slow down and connect the sound segment, or connect the sound segment again and again (repeatedly).

Furthermore, the connecting unit 330 may dispose a sound segment at a position of a fast reproduction video corresponding to a scene of an input moving image to which the sound segment belongs. For example, the connecting unit 330 may allocate, to a video, a sound segment of a class corresponding to a scene of the video. Accordingly, the scene of the video matches the scene of the sound, and thus synchronization thereof is achieved.

Further, the connecting unit 330 may connect sound segments extracted from a non-utterance section by the extraction unit 320. Accordingly, a shortened sound obtained by connecting environmental sounds is generated, and thus a viewer can easily understand a situation or an ambience of a video. In addition, the connecting unit 330 may connect sound segments extracted from a non-utterance section and further connect event sounds extracted by the extraction unit 320 thereto over the sound. Accordingly, a shortened sound may include a sudden sound such as a sound of a firework or a short utterance sound of "we are arriving at OO." Thus, a viewer can more easily understand a situation or an ambience of video, and content of a short utterance can be easily heard.

Examples of connecting processes by the connecting unit 330 have been described above. A connecting process by the connecting unit 330 will be described below with reference to FIG. 6 with a specific example.

Figure 6:
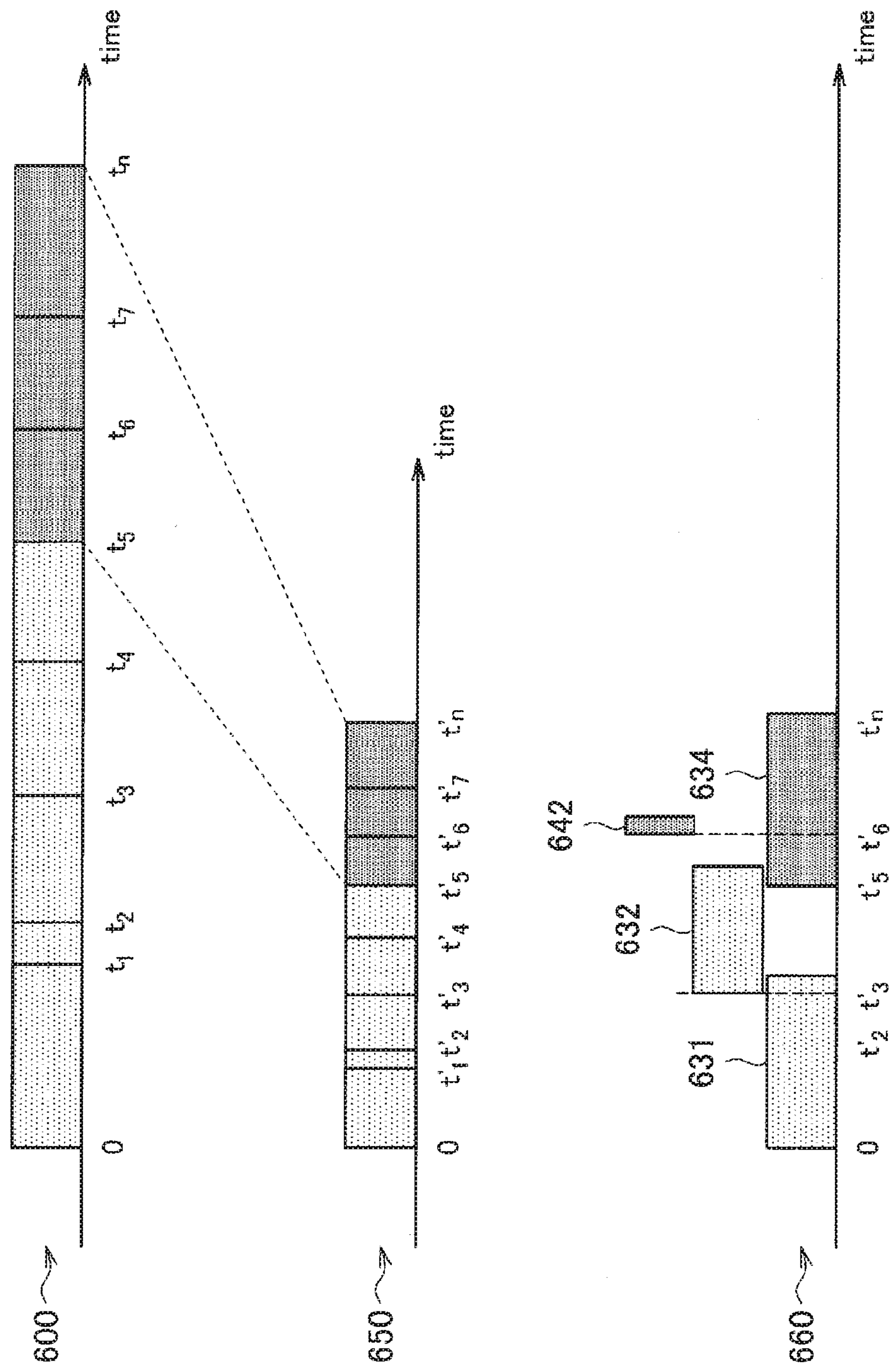
FIG. 6 is a diagram for describing an example of a connecting process performed by a connecting unit according to the present embodiment.

FIG. 6 is a diagram for describing an example of a connecting process performed by the connecting unit 330 according to the present embodiment. As illustrated in FIG. 6, the example of the connecting process will be described focusing on the original sound 600 described with reference to FIG. 5. First, for example, the connecting unit 330 generates a reference timestamp 650 from the original sound 600. The reference timestamp 650 refers to information indicating a position of a division point when the original sound is reproduced at a high speed. A case in which, for example, a rate of a reproduction speed of a fast reproduction video is m times a fixed value may be assumed. In this case, if a division time of the original sound is set to $t_i$ (i=1, 2, . . . , n), a division point $t'_i$ when the original sound is reproduced at a high speed is $t'_i = t_i/m$. In addition, when a rate of a reproduction speed of a fast reproduction video changes at a time t, if a rate of a reproduction speed of a time t is set to m(t), a division point $t'_i$ when the original sound is reproduced at a high speed is expressed by the following expression.

[Math. 2]

$$t'_i = \int_0^{t_i} \frac{1}{m(t)} dt \quad \text{Expression 2}$$

Then, the connecting unit 330 disposes sound segments at appropriate positions with reference to the reference timestamp 650, and thereby generates a shortened sound 660.

The connecting unit 330 may allocate a sound segment extracted having a time $t_{i-1}$ as a starting point to, for example, a time $t'_{i-1}$. In the example illustrated in FIG. 6, the connecting unit 330 disposes a sound segment 631 extracted having a time 0 of the original sound 600 as a starting point at the time 0 of the shortened sound 660. In addition, the connecting unit 330 disposes a sound segment 632 extracted having a time $t_3$ of the original sound 600 as a starting point at a time $t'_3$ of the shortened sound 660. Furthermore, the connecting unit 330 disposes a sound segment 634 extracted having a time $t_5$ of the original sound 600 as a starting point at a time $t'_5$ of the shortened sound 660.

When there is no sound extracted having the time $t_{i-1}$ as a starting point, however, the connecting unit 330 disposes a sound segment that belongs to the same scene. For example, the connecting unit 330 may allocate a sound segment extracted from the same scene as a scene of the time of an input moving image to the time $t'_{i-1}$. In the example illustrated in FIG. 6, the sound segment 631 extracted from the same scene as that of a time $t_2$ of the original sound 600 is continuously allocated to a time $t'_2$ of the shortened sound 660.

In addition, the connecting unit 330 may connect a sound segment extracted from a non-utterance section and further connect an event sound thereover. In the example illustrated in FIG. 6, the connecting unit 330 connects the sound segments 631, 632, and 634 that are environmental sounds to each other and then overlaps a sound segment 642 that is an event sound thereon. Here, the sound segment 642 is disposed at a time $t'_6$ corresponding to a time t6 at which the sound segment 642 has been extracted. In addition, the connecting unit 330 may connect sound segments such that they overlap. In the example illustrated in FIG. 6, the connecting unit 330 causes the sound segments 631 and 632, and 632 and 634 to partly overlap. The connecting unit 330 may apply cross-fade to the overlapping parts.

The connecting process by the connecting unit 330 has been described above using a specific example.

Figure 7:
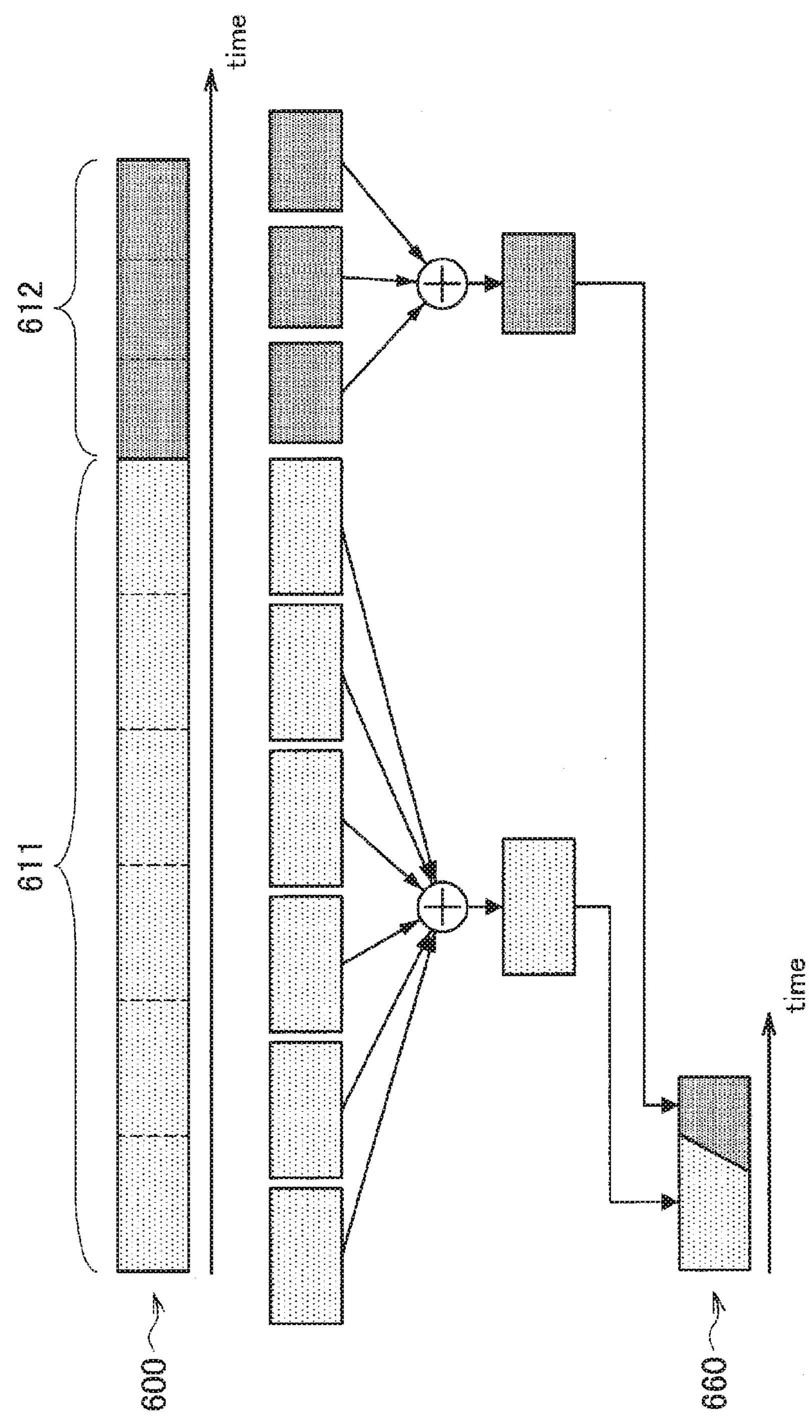
FIG. 7 is a diagram for describing an example of a connecting process performed by the connecting unit according to the present embodiment.

Note that the above-described shortened sound generation method is an example, and the present technology is not limited thereto. For example, the connecting unit 330 may continuously use the same environmental sound as long as a scene thereof is not changed. In addition, the connecting unit 330 may generate a shortened sound by dividing and synthesizing sections classified as the same scene as illustrated in FIG. 7. FIG. 7 is a diagram for describing an example of a connecting process performed by the connecting unit 330 according to the present embodiment. In the example illustrated in FIG. 7, the connecting unit 330 synthesizes sound segments extracted from a scene 611 and sound segments extracted from a scene 612 of the original sound 600 and connects the synthesized sound segments, and thereby generates the shortened sound 660.

The configuration example of the moving image generation device 1 according to the present embodiment has been described above. Next, an operational process example of the moving image generation device 1 according to the present embodiment will be described with reference to FIGS. 8 to 10.

<2.2. Operational Process Example>

Figure 8:
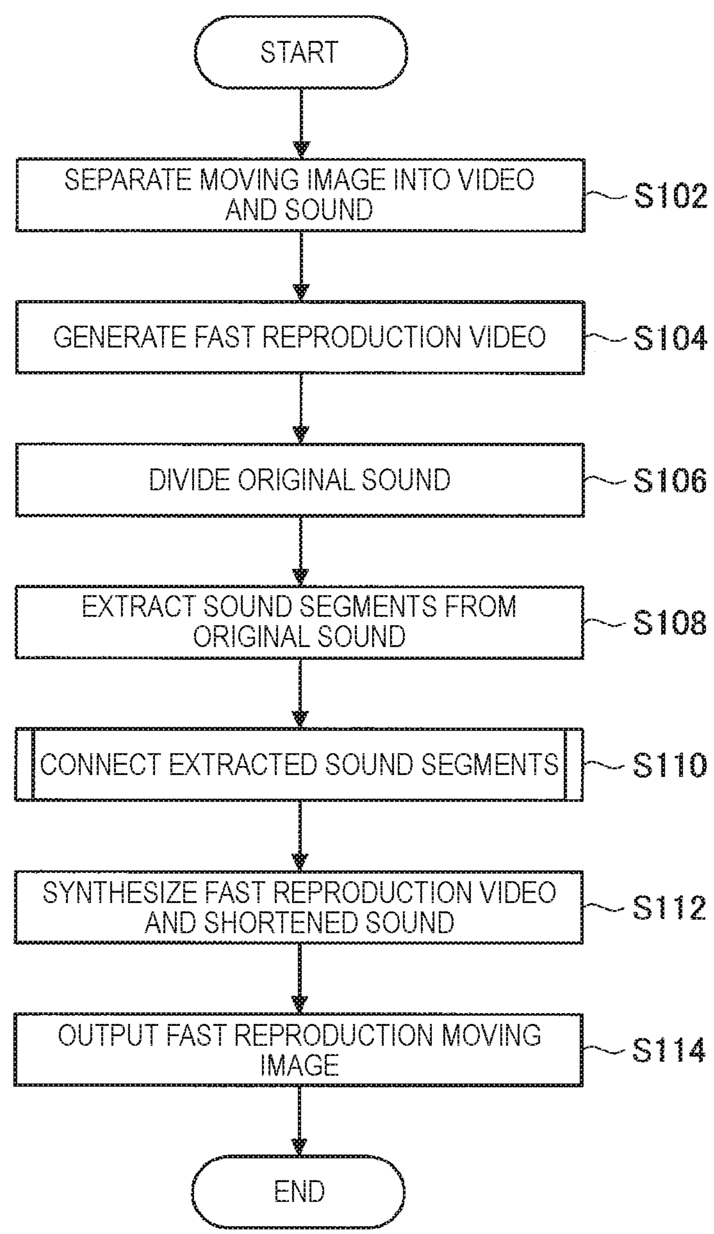
FIG. 8 is a flowchart showing an example of a flow of a fast moving image generation process executed by the moving image generation device according to the present embodiment.

FIG. 8 is a flowchart showing an example of a flow of a fast moving image generation process executed by the moving image generation device 1 according to the present embodiment.

As shown in FIG. 8, first, the separation unit 100 separates an input moving image into a video part and a sound part in Step S102.

Next, in Step S104, the video generation unit 200 generates a fast reproduction video.

Next, in Step S106 to S110, the sound generation unit 300 generates a shortened sound from the original sound. Specifically, the division unit 310 divides the sound part of the moving image into one or more sections in Step S106. Next, the extraction unit 320 extracts one or more sound segments from the sections obtained by division of the division unit 310 in Step S108. Then, the connecting unit 330 connects the extracted sound segments in Step S110.

Next, the synthesizing unit 400 synthesizes the fast reproduction video and the shortened sound in Step S112.

Then, the output control unit 500 controls the output unit 20 such that a fast reproduction moving image is output in Step S114.

The example of the flow of the fast moving image generation process has been described above. Next, the above-described connecting process of Step S110 will be described in more detail.

Figure 9:
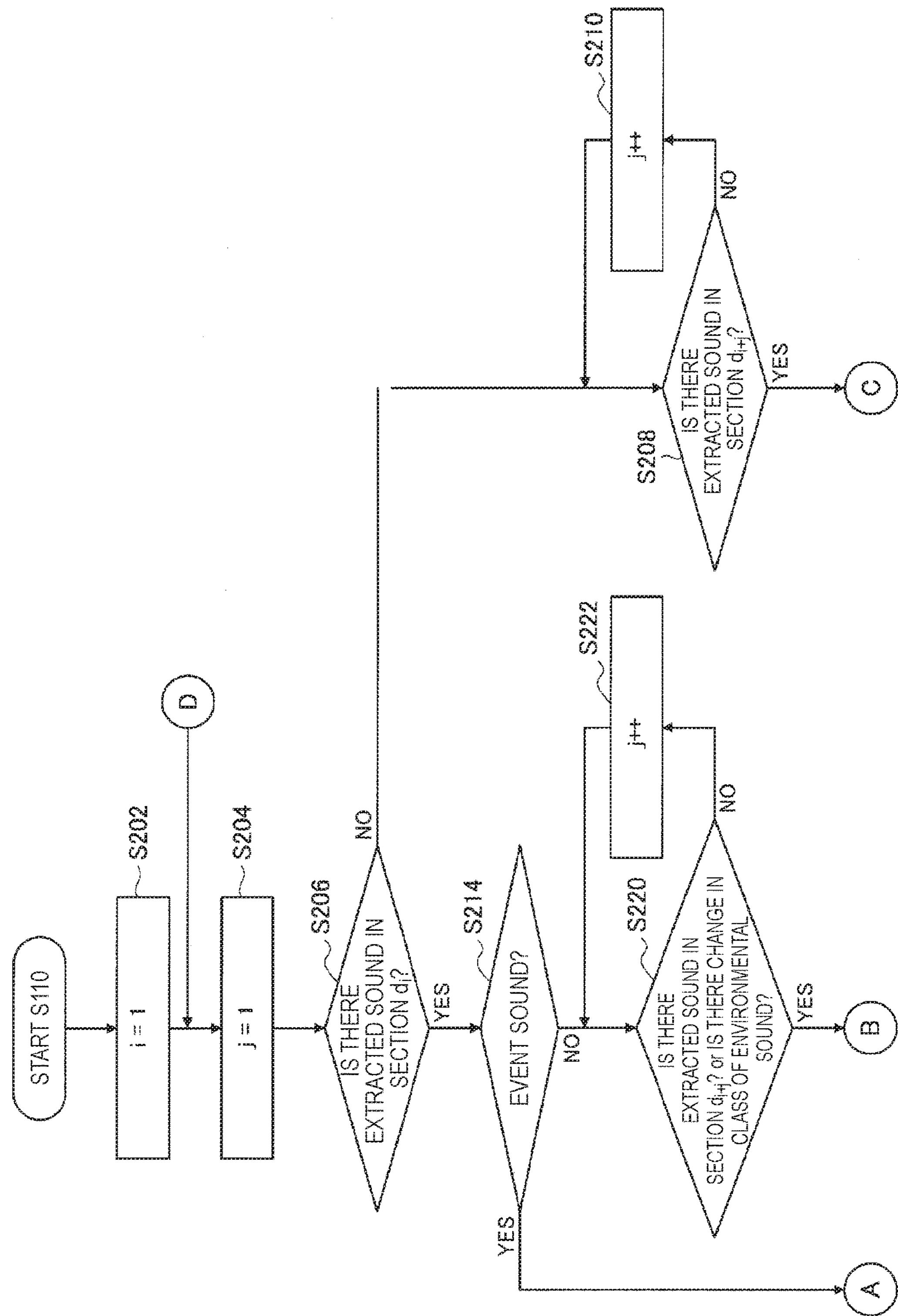
FIG. 9 is a flowchart showing an example of a flow of a connecting process executed by the moving image generation device according to the present embodiment.
Figure 10:
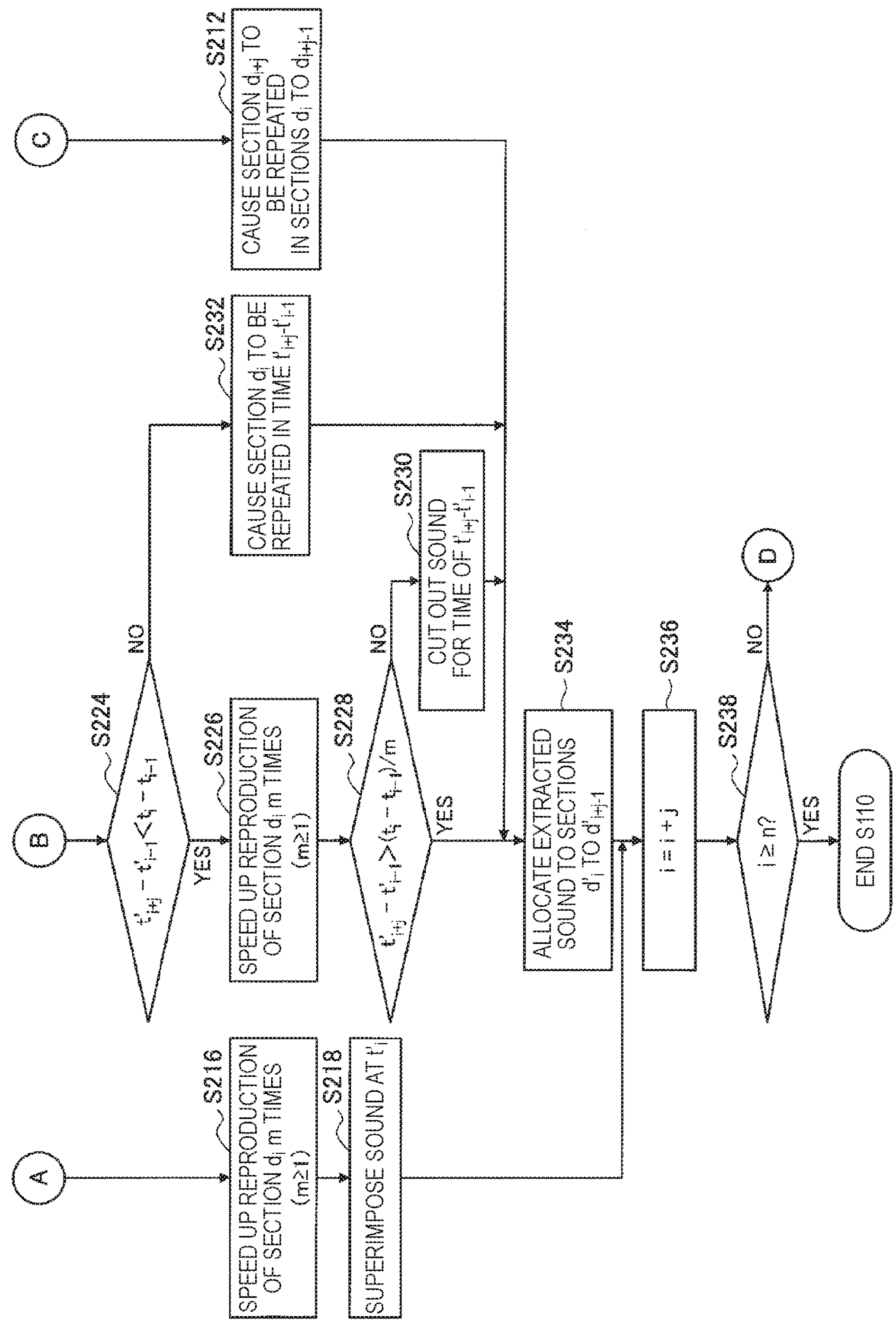
FIG. 10 is a flowchart showing the example of the flow of the connecting process executed by the moving image generation device according to the present embodiment.

FIG. 9 and FIG. 10 are a flowchart showing an example of a flow of a connecting process executed by the moving image generation device 1 according to the present embodiment. Note that, in the flow, a sound section from $t_{i-1}$ to $t_i$ is set to $d_i$ and a sound section from $t'_{i-1}$ to $t'_i$ is $d'_i$. In addition, an extracted sound segment is also referred to as an extracted sound.

First, the connecting unit 330 sets i=1 in Step S202 and j=1 in Step S204. Next, in Step S206, the connecting unit 330 determines whether or not there is an extracted sound in a section $d_i$.

When it is determined that there is no extracted sound in a section $d_i$ (No in S206), j is incremented and it is determined whether there is an extracted sound in a section $d_{i+j}$ in Step S208 and S210. In this manner, the connecting unit 330 searches for sound sections until an extracted sound is found. When an extracted sound is found (YES in S208), the connecting unit 330 allocates an extracted sound of a section $d_{i+j}$ to sections $d'_i$ to $d'_{i+j-1}$ in Step S234. Note that, when a length of an extracted sound is shorter than the length from $d'_i$ to $d'_{i+j-1}$, the connecting unit 330 causes the extracted sound of the section $d_{i+j}$ to be repeated in the sections $d_i$ to $d_{i+j-1}$ (Step S212) and allocates the extracted sound to the sections $d'_i$ to $d'_{i+j-1}$. On the other hand, when a length of an extracted sound is longer than length from $d'_i$ to $d'_{i+j-1}$, the connecting unit 330 may cut the extracted sound to this length and allocate the extracted sound to the sections $d'_i$ to $d'_{i+j-1}$.

When it is determined that there is an extracted sound in the section $d_i$ (Yes in S206), the connecting unit 330 determines whether or not the extracted sound is an event sound in Step S214.

When it is determined that the extracted sound is an event sound (Yes in S214), the connecting unit 330 speeds up the extracted sound of the section $d_i$ m times ($m \geq 1$) in Step S216 and superimposes the sound on a time $t'_i$. Accordingly, a timing and a speed of the event sound are synchronized with the fast reproduction video.

When it is determined that the extracted sound is not an event sound (No in S214), the connecting unit 330 decides a section to which the extracted sound is to be allocated. Specifically, when no sound segment is extracted from the section $d_{i+j}$ following the section $d_i$, the connecting unit 330 uses the extracted sound of the section $d_i$ also in the section $d_{i+j}$. In addition, when no sound segment is extracted from the section $d_{i+j}$ and a class of an environmental sound changes, it is desirable to allocate the environmental sound of the class before the change to a video of a scene corresponding to the class.

Thus, the connecting unit 330 first determines whether there is an extracted sound in the section $d_{i+j}$ or whether a class of an environmental sound has changed in the section $d_{i+j}$ while incrementing j in Step S220 and S222. When an extracted sound is found or a class of an environmental sound has changed (Yes in S220), the connecting unit 330 determines whether $t'_{i+j}-t'_{i-1}$ is shorter than $t_i-t_{i-1}$ in Step S224. Then, the connecting unit 330 causes the extracted sound to be repeated or cuts or speeds up the extracted sound so that the length of the extracted sound becomes the length of an allocated section.

When, for example, $t'_{i+j}-t'_{i-1}$ is determined to be shorter than $t_i-t_{i-1}$ (Yes in S224), the connecting unit 330 speeds up the extracted sound of the section $d_i$ m times ($m \geq 1$) in Step S226. The value of m is desirably, for example, about 1.5 with which a tone is not significantly changed. Furthermore, the value of m is desirably set such that $(t_i-t_{i-1})/m$ approximates to $t'_{i+j}-t'_{i-1}$ in a range in which the value does not exceed 1.5. Accordingly, a length of sound after fast reproduction can approach a target value. Specifically, the connecting unit 330 can set the value of m by calculating $m=\min((t'_{i+j}-t'_{i-1})/(t_i-t_{i-1}), 1.5)$. Then, the connecting unit 330 determines in Step S228 whether $t'_{i+j}-t'_{i-1}$ is longer than the length of the sped-up extracted sound, i.e., $(t_i-t_{i-1})/m$. When $t'_{i+j}-t'_{i-1}$ is determined to be shorter than the length (No in S228), the connecting unit 330 cuts out a sound for a time of $t'_{i+j}-t'_{i-1}$ from the sped-up extracted sound in Step S230 and allocates the sound to sections $d'_i$ to $d'_{i+j-1}$ in Step S234. When $t'_{i+j}-t'_{i-1}$ is determined to be longer than the length (No in S228), the connecting unit 330 allocates the sped-up extracted sound to the sections $d'_i$ to $d'_{i+j-1}$ in Step S234. Note that, when the difference between the lengths is large, the connecting unit 330 may cause the sped-up extracted sound to be repeated and allocate the sound to sections $d'_i$ to $d'_{i+j-1}$ in Step S234. When the value of m is set such that $(t_i-t_{i-1})/m$ approximates to $t'_{i+j}-t_{i-1}$ in S226 described above, they have no difference or a slight difference, and thus the connecting unit 330 can skip a repetition process. In addition, when $t'_{i+j}-t'_{i-1}$ is determined to be longer than $t_i-t_{i-1}$ (No in S224), the connecting unit 330 causes the extracted sound of the section $d_i$ to be repeated in the time $t'_{i+j}-t'_{i-1}$ in Step S232, and allocates the extracted sound to the sections $d'_i$ to $d'_{i+j-1}$ in Step S234.

When the shortened sound to $t'_{i+j-1}$ is generated as described above, the connecting unit 330 takes the value of i in front of the j section in which no shortened sound has yet been generated by replacing the value of i with i+j in Step S236 and repeats the process up to the final section. For example, the connecting unit 330 determines whether or not $i \geq n$ is satisfied in Step S238, and returns to Step S204 if $i<n$ is satisfied, and finishes the process if $i \geq n$ is satisfied. Note that, although being omitted in the above description, the connecting unit 330 may set a time margin $\Delta t$ before and after the division points for a cross-fade process.

The example of the flow of the connecting process has been described above.

«3. Second Embodiment»

A second embodiment will be described with reference to FIGS. 11 to 15. The present embodiment is to generate a shortened sound on the basis further of an input video.

(A) Overall Configuration Example

Figure 11:
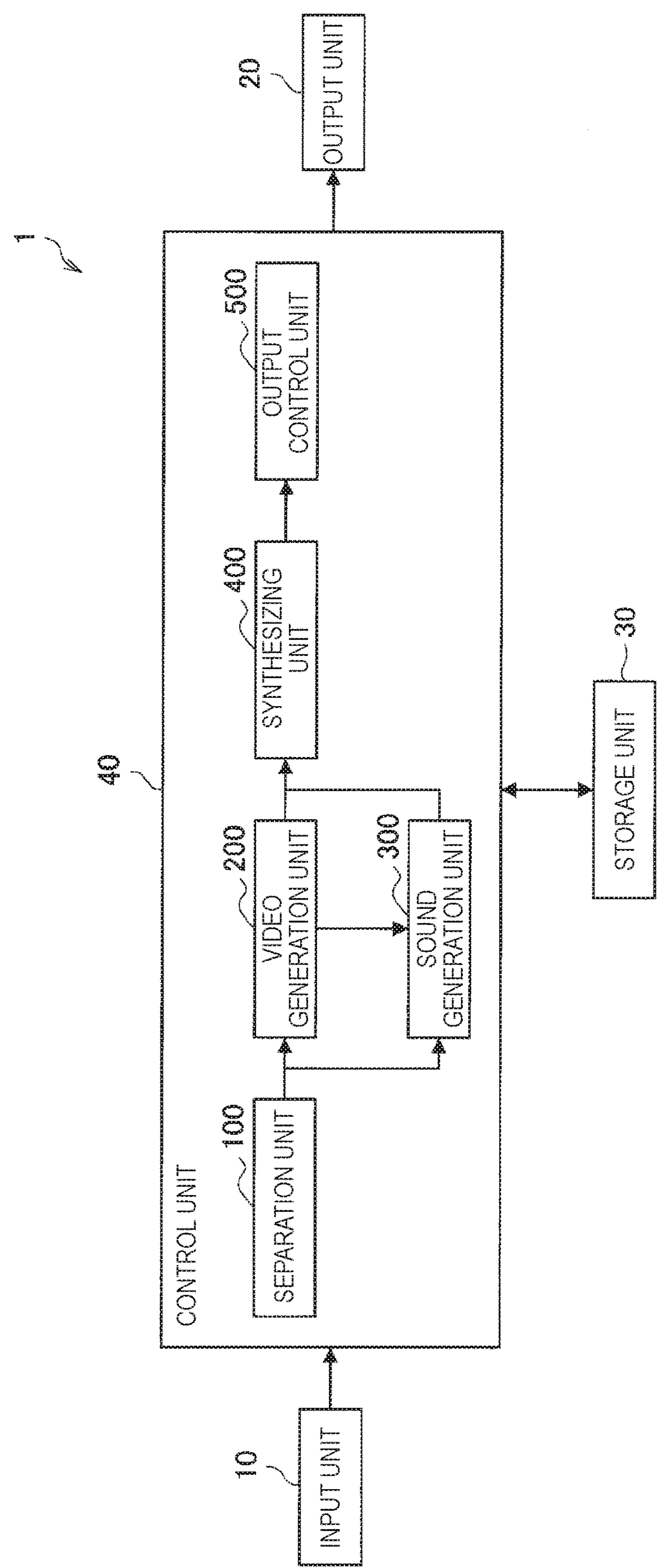
FIG. 11 is a block diagram illustrating a logical configuration example of the moving image generation device according to the present embodiment.

FIG. 11 is a block diagram illustrating a logical configuration example of a moving image generation device 1 according to the present embodiment. As illustrated in FIG. 11, the configuration example of the moving image generation device 1 according to the present embodiment is similar to that of the first embodiment. In the present embodiment, a sound generation unit 300 generates a shortened sound on the basis of a video analysis result of a video part of a moving image. Accordingly, the shortened sound is synchronized with a fast reproduction video more accurately and thus awkwardness is further reduced.

(B) Configuration Example of Sound Generation Unit 300

Figure 12:
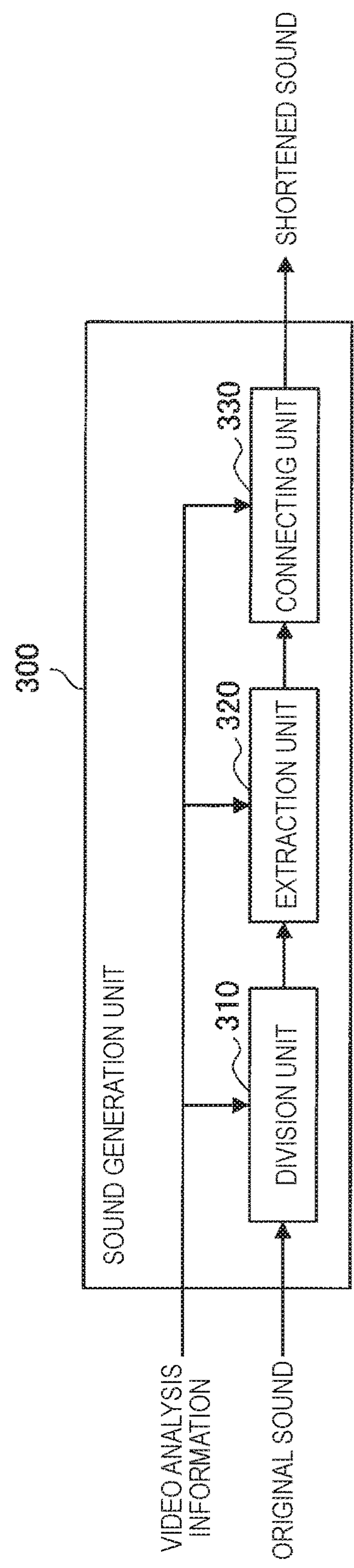
FIG. 12 is a block diagram illustrating a logical configuration example of the sound generation unit according to the present embodiment.

FIG. 12 is a block diagram illustrating a logical configuration example of the sound generation unit 300 according to the present embodiment. As illustrated in FIG. 12, a division unit 310, an extraction unit 320, and a connecting unit 330 according to the present embodiment each refer to video analysis information indicating a video analysis result.

(B.1) Division Unit 310

Figure 13:
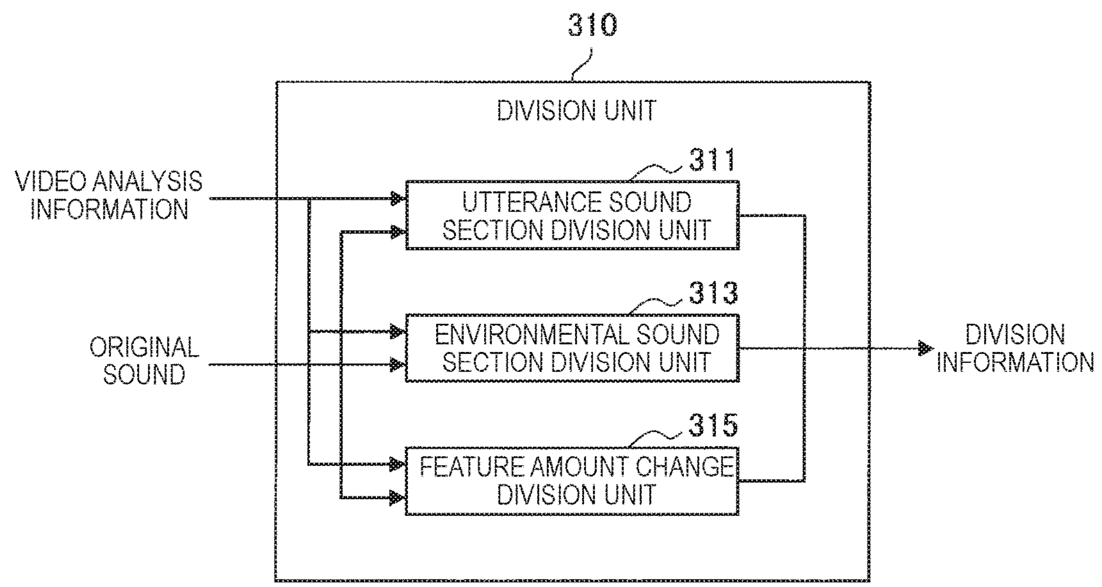
FIG. 13 is a block diagram illustrating a logical configuration example of the division unit according to the present embodiment.

FIG. 13 is a block diagram illustrating a logical configuration example of the division unit 310 according to the present embodiment. As illustrated in FIG. 13, an utterance sound section division unit 311, an environmental sound section division unit 313, and a feature amount change division unit 315 divide the original sound referring to video analysis information and output division information that is information indicating division points.

(B.1.1) Utterance Sound Section Division Unit 311

The utterance sound section division unit 311 divides sound into utterance sections and non-utterance sections referring to the video analysis information. For example, the utterance sound section division unit 311 may recognize motions of the lips of a person shown in a video and thus recognize sound with higher accuracy. Note that the technology disclosed in JP 2013-257418A may be employed.

(B.1.2) Environmental Sound Section Division Unit 313

The environmental sound section division unit 313 divides a sound part of a moving image into sections of each scene of the moving image referring to the video analysis result. The environmental sound section division unit 313 learns, for example, categories of videos and sounds using many landscape moving images in advance. For example, the environmental sound section division unit 313 learns in advance a correspondence that driving sounds, engine sounds, and the like of cars correspond to videos of heavy traffic roads and rustling sounds of leaves, and chirping sounds of birds and insects correspond to a video of greenery in parks. In that case, as feature amounts of videos, for example, an optical flow change amount, a scale-invariant feature transform (SIFT) feature amount, and the like can be used. In addition, in order to actually classify environmental sounds, the environmental sound section division unit 313 performs the classification on the basis of, for example, the video analysis information or feature amounts of video analysis result information and the sounds, and sets division points at positions at which classifications are divided. For example, the environmental sound section division unit 313 classifies a sound acquired in a section of a video in which a car or a train appears as a driving sound of a car or a train. In addition, the environmental sound section division unit 313 classifies a sudden sound acquired from a section of a video in which a firework appears as a sound of a firework. In this manner, the environmental sound section division unit 313 can improve accuracy in classifying environmental sounds with reference to video analysis information.

(B.1.3) Feature Amount Change Division Unit 315

The feature amount change division unit 315 performs division on the basis not only of a feature amount of a sound but also of a time point at which a feature amount of a video changes. As such a feature amount, for example, an optical flow change amount, an SIFT feature amount, and the like can be employed.

(B.2) Extraction Unit 320

The extraction unit 320 extracts one or more sound segments on the basis further of video analysis information. For example, the extraction unit 320 extracts sound segments of sections of scenes that are dominant in a video on the basis of video analysis result information to thin out sound segments of sections that are not dominant. Accordingly, when a barking sound of a dog continues for 8 seconds in an original video and the time is shortened to about less than one second in fast reproduction, for example, it is possible to prevent the barking sound of the dog from being included in a shortened sound.

Specifically, for example, the extraction unit 320 determines whether or not a sound segment is a sound made from a dominant object of a video. In this case, the extraction unit 320 can determine whether it is a dominant object on the basis of a time at which the object appears in the video and a size of the appearance region. Then, the extraction unit 320 may extract a sound that has been determined to be made from the dominant object. For example, the extraction unit 320 extracts the barking sound of a dog when a dog appears in a large size for a long period of time in the video as an event sound, or thins out the barking sound of a dog when the dog barely appears in the video. Here, an extraction process will be described using a specific example with reference to FIG. 14.

Figure 14:
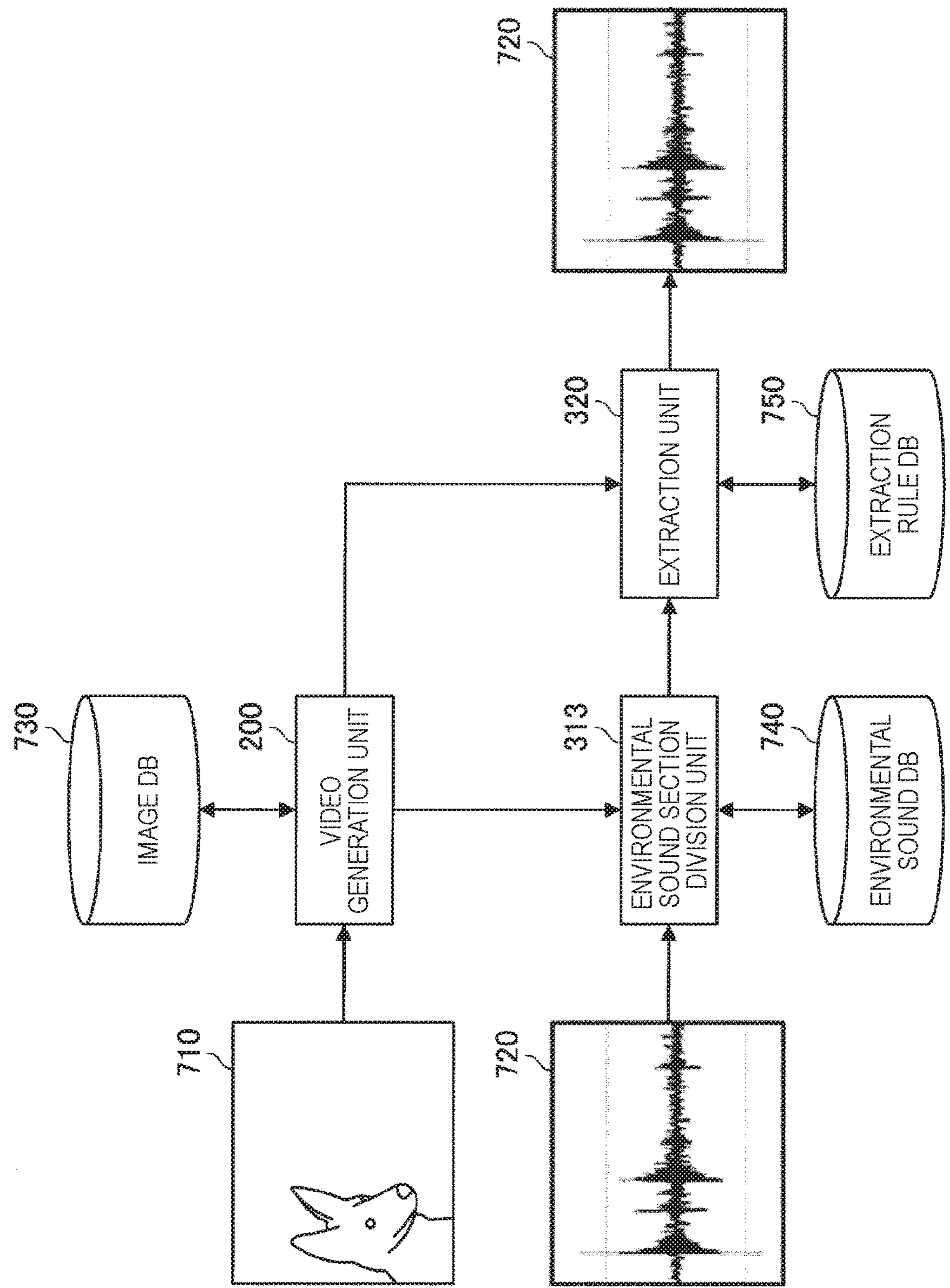
FIG. 14 is a diagram for describing an example of the extraction process performed by the extraction unit according to the present embodiment.

FIG. 14 is a diagram for describing an example of the extraction process performed by the extraction unit 320 according to the present embodiment. As illustrated in FIG. 14, the video generation unit 200 determines that a dominant object of a video 710 is a dog with reference to, for example, an image DB730. In addition, the environmental sound section division unit 313 determines that a sound segment 720 is an environmental sound that is the barking sound of a dog with reference to an environmental sound DB740. Then, the extraction unit 320 extracts the sound segment 720 since the sound segment 720 is a sound made by a dog dominant in the video and the barking sound of a dog has been registered in an extraction rule DB 750 as a sound to be extracted as an event sound.

(B.3) Connecting Unit 330

The connecting unit 330 generates a shortened sound by connecting sound segments extracted by the extraction unit 320 with reference to video analysis information. For example, the connecting unit 330 may dispose the sound segments at positions at which a time-series change of volume of the sound segments matches a time-series change of a subject appearing in a fast reproduction video. The connecting unit 330 adjusts connection positions or a reproduction speed such that, for example, a position in a video at which a sound segment is the highest matches a position of the video at which the object serving as the source of the sound segment is assumed to be the closest to a camera. Accordingly, the shortened sound is synchronized with the fast reproduction video more accurately, and thus awkwardness is further reduced. An example of a connecting process will be described below with reference to FIG. 15 with a specific example.

Figure 15:
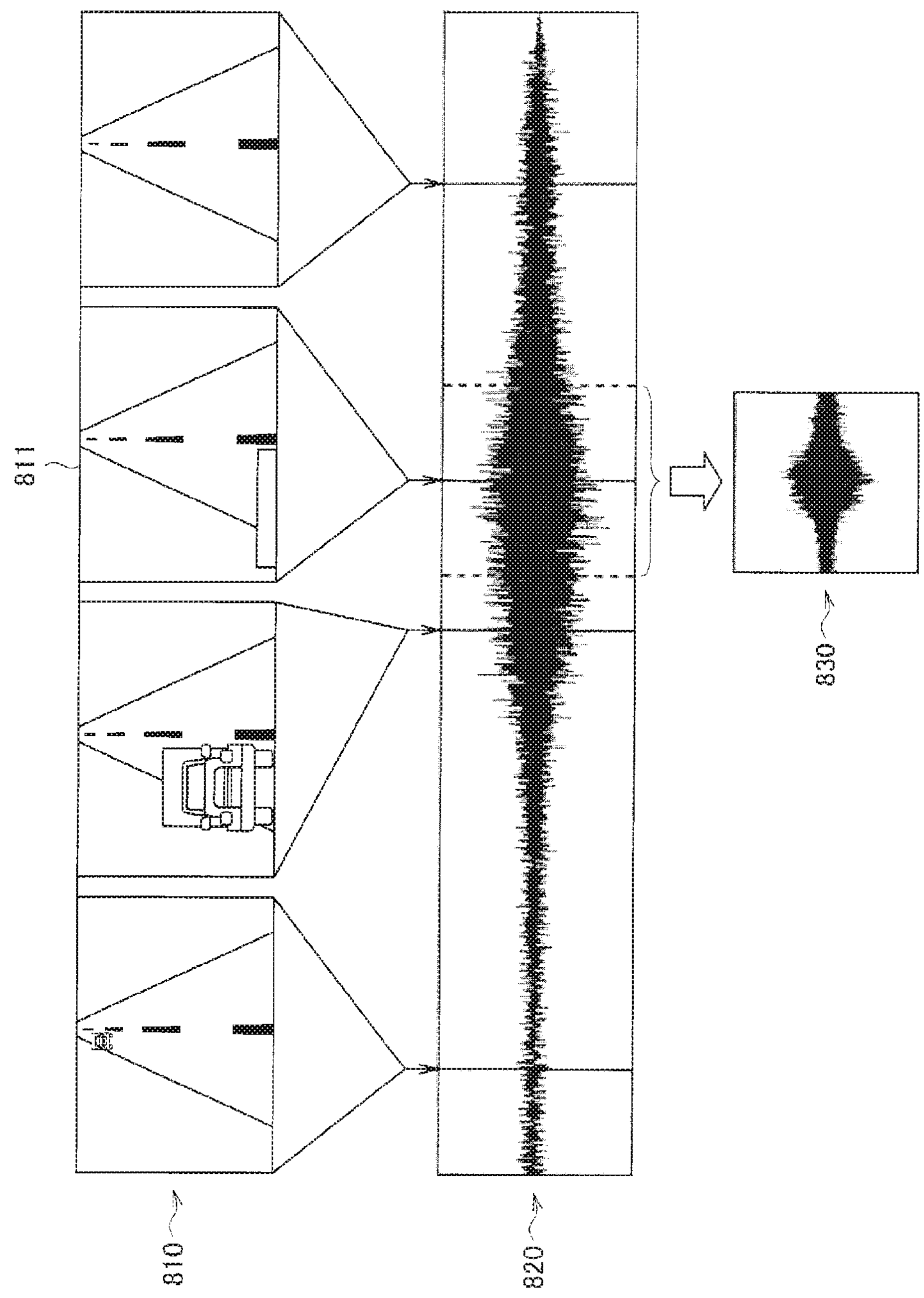
FIG. 15 is a diagram for describing an example of the connecting process performed by the connecting unit according to the present embodiment.

FIG. 15 is a diagram for describing an example of the connecting process performed by the connecting unit 330 according to the present embodiment. For example, an event sound 820 that is a driving sound of a car is assumed to be extracted by the extraction unit 320 as a sound segment corresponding to a video 810. The connecting unit 330 sets, for example, a time of a video 811 at which the car gradually appearing in the video 810 is assumed to be closest to a camera to match a time at which the volume of the event sound 820 is the maximum. At that time, the connecting unit 330 may generate and connect an event sound 830 obtained by cutting out a waveform and performing a fade process thereon so that a driving sound starts smoothly from around the time at which the object disappears from the video and fades away thereafter. Accordingly, the time at which the volume of the driving sound of the car is the maximum matches the time at which the car is at the closest position in the video.

«4. Third Embodiment»

Next, a third embodiment will be described with reference to FIG. 16. The present embodiment is an embodiment in which a fast reproduction video is generated on the basis of sound.

Figure 16:
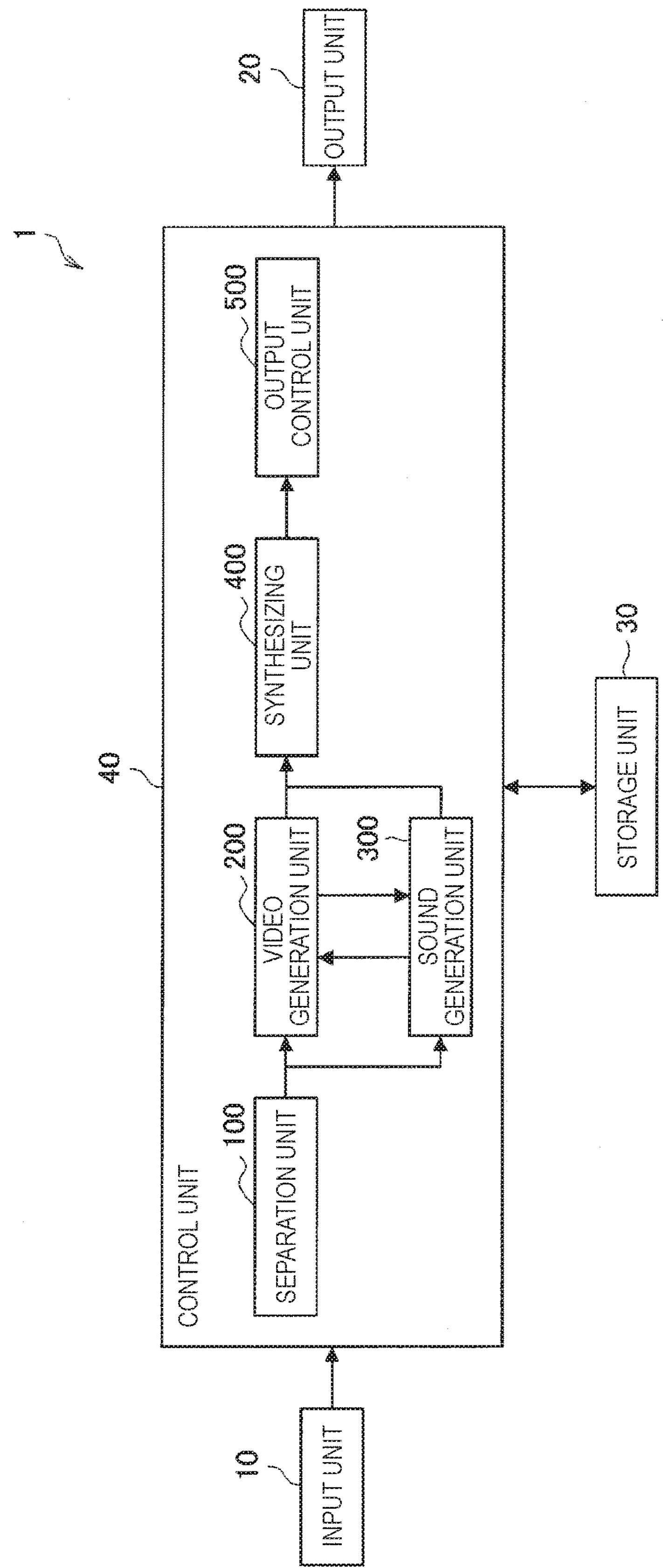
FIG. 16 is a block diagram illustrating a logical configuration example of the moving image generation device according to the present embodiment.

FIG. 16 is a block diagram illustrating a logical configuration example of a moving image generation device according to the present embodiment. As illustrated in FIG. 16, the configuration example of the moving image generation device 1 according to the present embodiment is similar to that of the first embodiment. In the present embodiment, a video generation unit 200 controls a reproduction speed of a fast reproduction video in accordance with a sound analysis result of a sound part of a moving image. Accordingly, a shortened sound is synchronized with the fast reproduction video more accurately, and thus awkwardness is further reduced.

There is a human nature of remembering moments with particularly impressive sounds, for example, one-shot sounds of fireworks, the sound of church bells, the sound of a waterfall, the sudden sound of brakes, or the like for a relatively long period of time, rather than forgetting the sound instantaneously. Thus, the video generation unit 200 generates a fast reproduction video that includes sections that are determined to be impressive to be reproduced at a relatively low speed of about one to two times an original speed on the basis of a sound analysis result and/or a video analysis result, for example, while the video is set to be reproduced at 10 times the speed overall. For example, the video generation unit 200 may define a class of an environmental sound and a word of utterance sounds that have been determined to be impressive in advance, and set a low speed for a section of an environmental sound in this classification or for a section in which such a word is recognized as a result of sound recognition and set a high speed for other sections. As a result, the fast reproduction video is reproduced such that monotonous scenes are reproduced at a high speed and impressive scenes are reproduced at a relatively low speed. Therefore, viewers can appreciate the video without overlooking the impressive scenes.

«5. Fourth Embodiment»

Next, a fourth embodiment will be described. The present embodiment is an embodiment in which a shortened sound is generated on the basis only of a video. A configuration example of the moving image generation device 1 according to the present embodiment is similar to that of FIG. 11.

The sound generation unit 300 according to the present embodiment generates a shortened sound in accordance only with a video analysis result from the video generation unit 200. For example, the division unit 310 divides a video into utterance sections and non-utterance sections on the basis of motions of a mouth of a person of the video, or classifies environmental sounds in accordance with a switch of a scene of the video. Then, the extraction unit 320 extracts, for example, sound segments in a similar manner as in the first embodiment, and the connecting unit 330 connects, for example, the sound segments in a similar manner as in the first embodiment, thereby generating a shortened sound.

«6. Hardware Configuration Example»

Figure 17:
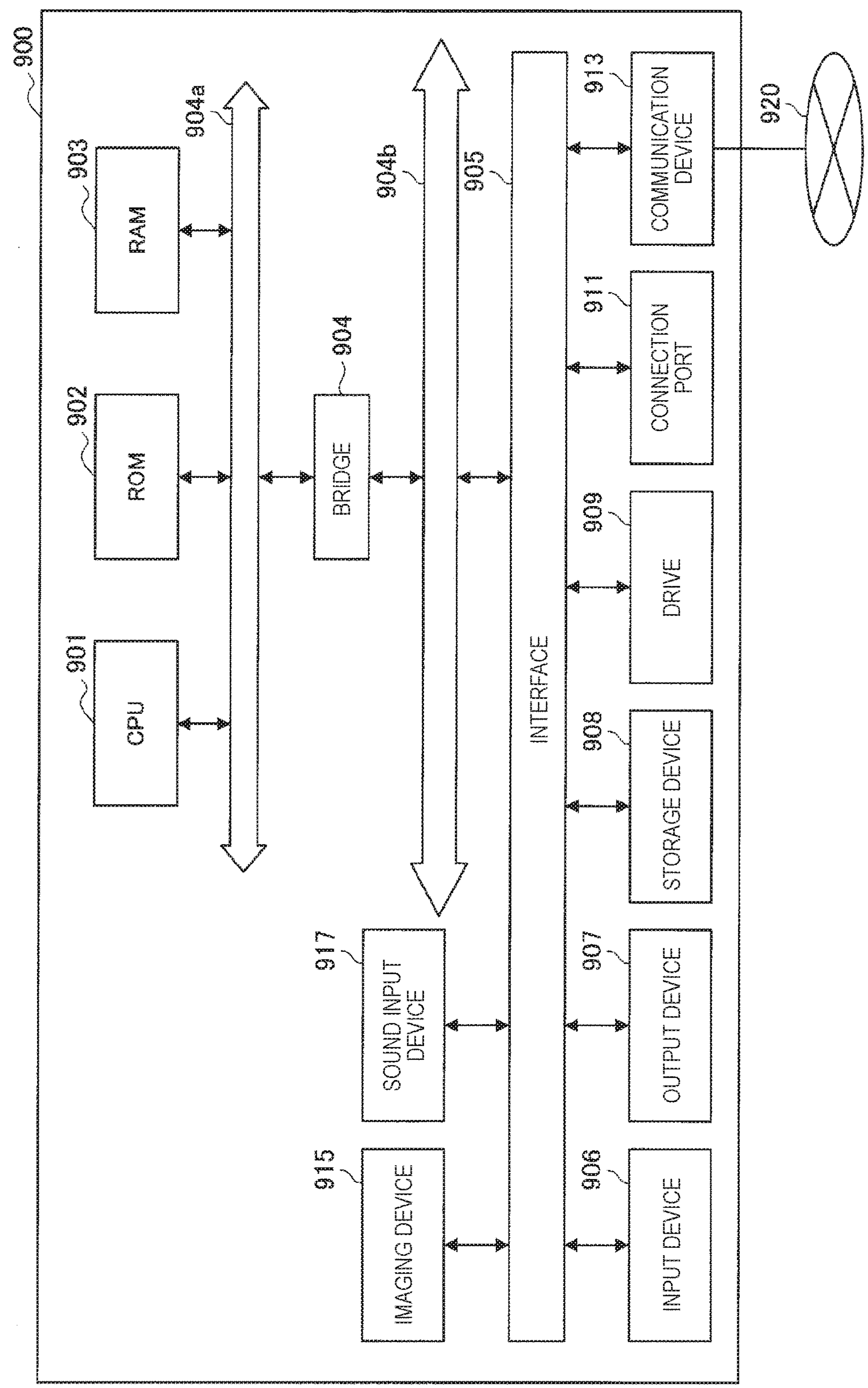
FIG. 17 is a block diagram illustrating a hardware configuration example of an information processing device according to the present embodiment.

Finally, a hardware configuration of an information processing apparatus according to the present embodiment will be described with reference to FIG. 17. FIG. 17 is a block diagram illustrating an example of the hardware configuration of the information processing apparatus according to the present embodiment. Meanwhile, the information processing apparatus 900 illustrated in FIG. 17 may realize the moving image generation device 1 illustrated in FIGS. 1, 11, and 16, for example. Information processing by the moving image generation device 1 according to the present embodiment is realized according to cooperation between software and hardware described below.

As illustrated in FIG. 17, the information processing apparatus 900 includes a central processing unit (CPU) 901, a read only memory (ROM) 902, a random access memory (RAM) 903 and a host bus 904*a*. In addition, the information processing apparatus 900 includes a bridge 904, an external bus 904*b*, an interface 905, an input device 906, an output device 907, a storage device 908, a drive 909, a connection port 911, a communication device 913, an imaging device 915 and a sound input device 917. The information processing apparatus 900 may include a processing circuit such as a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs used by the CPU 901, operation parameters and the like. The RAM 903 temporarily stores programs used in execution of the CPU 901, parameters appropriately changed in the execution, and the like. The CPU 901 may form the controller 40 illustrated in FIGS. 1, 11, and 16, for example.

The CPU 901, the ROM 902 and the RAM 903 are connected by the host bus 904*a* including a CPU bus and the like. The host bus 904*a* is connected with the external bus 904*b* such as a peripheral component interconnect/interface (PCI) bus via the bridge 904. Further, the host bus 904*a*, the bridge 904 and the external bus 904*b* are not necessarily separately configured and such functions may be mounted in a single bus.

The input device 906 is realized by a device through which a user inputs information, for example, a mouse, a keyboard, a touch panel, a button, a switch, a lever of the like. In addition, the input device 906 may be a remote control device using infrared ray or other electric waves or external connection equipment such as a cellular phone or a PDA corresponding to manipulation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by manipulating the input device 906.

The output device 907 is formed by a device that may visually or aurally notify the user of acquired information. As such devices, there is a display device such as a CRT display device, a liquid crystal display device, a plasma display device, an EL display device or a lamp, a sound output device such as a speaker and a headphone, a printer device and the like. The output device 907 outputs results acquired through various processes performed by the information processing apparatus 900, for example. Specifically, the display device visually displays results acquired through various processes performed by the information processing apparatus 900 in various forms such as text, images, tables and graphs. On the other hand, the sound output device converts audio signals composed of reproduced sound data, audio data and the like into analog signals and aurally outputs the analog signals. The aforementioned display device and sound output device may form the output unit 20 illustrated in FIGS. 1, 11, and 16, for example.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device or the like. The storage device 908 may include a storage medium, a recording medium recording data on the storage medium, a reading device for reading data from the storage medium, a deletion device for deleting data recorded on the storage medium and the like. The storage device 908 stores programs and various types of data executed by the CPU 901, various types of data acquired from the outside and the like. The storage device 908 may form the storage unit 30 illustrated in FIGS. 1, 11, and 16, for example.

The drive 909 is a reader/writer for storage media and is included in or externally attached to the information processing apparatus 900. The drive 909 reads information recorded on a removable storage medium such as a magnetic disc, an optical disc, a magneto-optical disc or a semiconductor memory mounted thereon and outputs the information to the RAM 903. In addition, the drive 909 can write information on the removable storage medium.

The connection port 911 is an interface connected with external equipment and is a connector to the external equipment through which data may be transmitted through a universal serial bus (USB) and the like, for example. The connection port 911 can form the input unit 10 and the output unit 20 illustrated in FIGS. 1, 11, and 16, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark) or wireless USB (WUSB), for example. In addition, the communication device 913 may be a router for optical communication, a router for asymmetric digital subscriber line (ADSL), various communication modems or the like. For example, the communication device 913 may transmit/receive signals and the like to/from the Internet and other communication apparatuses according to a predetermined protocol, for example, TCP/IP or the like. The communication device 913 may form the input unit 10 and the output unit 20 illustrated in FIGS. 1, 11, and 16, for example.

Further, the network 920 is a wired or wireless transmission path of information transmitted from devices connected to the network 920. For example, the network 920 may include a public circuit network such as the Internet, a telephone circuit network or a satellite communication network, various local area networks (LANs) including Ethernet (registered trademark), a wide area network (WAN) and the like. In addition, the network 920 may include a dedicated circuit network such as an internet protocol-virtual private network (IP-VPN).

An imaging device 915 includes a lens system composed of an imaging lens, an iris, a zoom lens, a focus lens and the like, a driving system for causing the lens system to perform a focus operation and a zoom operation, a solid-state imaging sensor array for photo-electrically converting imaging light acquired through the lens system to generate an imaging signal, and the like. The solid-state imaging sensor array may be realized by a charge coupled device (CCD) sensor array or a complementary metal oxide semiconductor (CMOS) sensor array, for example. The imaging device 915 outputs data of shot images in the form of digital signals. The imaging device 915 may form the input unit 10 illustrated in FIGS. 1, 11, and 16, for example.

The sound input device 917 has a microphone, a microphone amplifier circuit that amplifies sound signals obtained from the microphone, an A/D converter, a signal processing circuit that performs processes of noise removal, sound source separation, and the like on sound data, and the like. The sound input device 917 outputs sound signals converted into digital signals. The sound input device 917 can form, for example, the input unit 10 illustrated in FIGS. 1, 11, and 16.

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. The computer program may be delivered through a network, for example, without using the recording medium.

«7. Conclusion»

Embodiments of the present disclosure have been described above in detail with reference to FIGS. 1 to 17. As described above, the moving image generation device 1 generates a fast reproduction video from a video part of an input moving image, generates a shortened sound using a part of a sound part of the moving image, synthesizes the fast reproduction video and the shortened sound, and thereby generates a fast reproduction moving image. Accordingly, sounds reproduced from the fast reproduction moving image can be more natural.

The moving image generation device 1 may generate a shortened sound by, for example, disposing each of extracted sound segments at positions corresponding to those in a fast reproduction video and connecting the sound segments. Accordingly, a natural shortened sound that matches the fast reproduction video can be generated. Thus, for example, with respect to a fast reproduction moving image generated from a moving image captured while a person passes around various places such as parks, streets, and railways when he or she is walking or riding a bicycle, a viewer can listen to a shortened sound that matches scenes of the image. Accordingly, the viewer can easily understand a situation and an ambience of the photographed places. In addition, in the real estate business, for example, using a fast reproduction moving image generated from a moving image in which roads from a station to a real estate item are videoed, a viewer can catch the order of the roads from the station to a real estate item, and easily ascertain an ambience, public security, noise, and the like around the item in a short time. In addition, even when a point of view of a camera does not change, for example, a viewer can ascertain states and noise in time slots of morning, afternoon, and night and using a fast reproduction moving image generated from a moving image captured by a fixed-point observation camera.

The moving image generation device 1 may generate a shortened sound, for example, on the basis of a video analysis result of a video part of an input moving image. Accordingly, the moving image generation device 1 can set a reproduction speed to be relatively slow for a section of a video or a sound in which an event defined to be particularly impressive has been detected. Thus, the moving image generation device 1 can reproduce impressive scenes over some time while reproducing many monotonous scenes fast. For example, the moving image generation device 1 can generate a fast reproduction moving image from a moving image captured during climbing a mounting and set its reproduction speed to be relatively slow only for impressive events of a scene in which a user passes close to a waterfall, a scene in which charming bird singing is heard, a scene in which the user finds a rare plant and speaks out its name, and the like.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, although the examples in which the moving image generation device 1 is realized as one information processing device has been described above, the present technology is not limited thereto. The moving image generation device 1 may be realized as, for example, a single device or an information processing system that includes parts of or the entire moving image generation device as separate devices.

Note that it is not necessary for the processing described in this specification with reference to the flowchart to be executed in the order shown in the flowchart. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a video generation unit configured to generate a fast reproduction video from a video part of an input moving image;

a sound generation unit configured to generate a shortened sound using a part of a sound part of the moving image; and a synthesizing unit configured to synthesize the fast reproduction video generated by the video generation unit and the shortened sound generated by the sound generation unit and generate a fast reproduction moving image.

(2)

The information processing device according to (1), in which the sound generation unit further includes an extraction unit configured to extract one or more sound segments from a part of the sound part of the moving image, and a connecting unit configured to generate the shortened sound by disposing each of the sound segments extracted by the extraction unit at a position corresponding to the fast reproduction video and connecting the sound segments.

(3)

The information processing device according to (2), in which the connecting unit disposes a reproduction start position of each of the sound segments at a position of the fast reproduction video of the moving image corresponding to a starting point of the sound segment.

(4)

The information processing device according to (2) or (3), in which the sound generation unit further includes a division unit configured to divide the sound part of the moving image into sections of respective scenes of the moving image, and the extraction unit extracts the one or more sound segments from each of the sections of the respective scenes obtained by division of the division unit.

(5)

The information processing device according to (4), in which the connecting unit disposes the sound segments at positions of the fast reproduction video corresponding to scenes of the moving image to which the sound segments belong.

(6)

The information processing device according to any one of (2) to (5), in which the sound generation unit further includes a division unit configured to divide the sound part of the moving image into an utterance section and a non-utterance section, and the connecting unit connects the sound segments extracted from the non-utterance section by the extraction unit.

(7)

The information processing device according to (6), in which the connecting unit further overlaps an event sound extracted by the extraction unit.

(8)

The information processing device according to any one of (2) to (7), in which the connecting unit connects the sound segments to each other in an overlapping manner.

(9)

The information processing device according to (8), in which the connecting unit applies cross-fade to overlapping parts of the sound segments.

(10)

The information processing device according to any one of (2) to (9), in which the connecting unit speeds up and connects the sound segments.

(11)

The information processing device according to any one of (2) to (10), in which the sound generation unit generates the shortened sound on the basis of a video analysis result of the video part of the moving image.

(12)

The information processing device according to (11), in which the connecting unit disposes the sound segments at positions at which a time-series change of volume of the sound segments matches a time-series change of a subject appearing in the fast reproduction video.

(13)

The information processing device according to any one of (1) to (12), in which the video generation unit controls a reproduction speed of the fast reproduction video in accordance with a sound analysis result of the sound part of the moving image.

(14)

An information processing system including:

a video generation unit configured to generate a fast reproduction video from a video part of an input moving image;

a sound generation unit configured to generate a shortened sound using a part of a sound part of the moving image; and a synthesizing unit configured to synthesize the fast reproduction video generated by the video generation unit and the shortened sound generated by the sound generation unit and generate a fast reproduction moving image.

(15)

An information processing method including:

generating a fast reproduction video from a video part of an input moving image;

generating a shortened sound using a part of a sound part of the moving image; and synthesizing, by a processor, the generated fast reproduction video and the shortened sound and generating a fast reproduction moving image.

(16)

A program causing a computer to function as:

a video generation unit configured to generate a fast reproduction video from a video part of an input moving image;

a sound generation unit configured to generate a shortened sound using a part of a sound part of the moving image; and a synthesizing unit configured to synthesize the fast reproduction video generated by the video generation unit and the shortened sound generated by the sound generation unit and generate a fast reproduction moving image.

REFERENCE SIGNS LIST

1 moving image generation device
10 input unit
20 output unit
30 storage unit
40 control unit
100 separation unit
200 video generation unit
300 sound generation unit
310 division unit
311 utterance sound section division unit
313 environmental sound section division unit
3131 feature amount calculation unit
3133 identifier
315 feature amount change division unit
320 extraction unit
330 connecting unit
400 synthesizing unit
500 output control unit

The invention claimed is:

1. An information processing device, comprising:
a central processing unit (CPU) configured to:
generate a fast reproduction video from a video part of a moving image;
extract a plurality of sound segments from a portion of a sound part of the moving image;
dispose the plurality of sound segments at a position corresponding to the fast reproduction video;
connect a first sound segment of the plurality of sound segments and a second sound segment of the plurality of sound segments in an overlapping manner;
generate a shortened sound based on the connection of the first sound segment and the second sound segment; and
synthesize the generated fast reproduction video and the generated shortened sound to generate a fast reproduction moving image.

2. The information processing device according to claim 1, wherein the CPU is further configured to dispose a reproduction start position of a third sound segment of the plurality of sound segments at a position of the fast reproduction video corresponding to a starting point of the third sound segment.

3. The information processing device according to claim 1, wherein the CPU is further configured to:
divide the sound part of the moving image into sections of respective scenes of the moving image, and
extract at least one sound segment of the plurality of sound segments from each of the sections of the respective scenes.

4. The information processing device according to claim 3, wherein the CPU is further configured to dispose the extracted at least one sound segment at positions of the fast reproduction video corresponding to scenes of the moving image to which the extracted at least one sound segment belongs.

5. The information processing device according to claim 1, wherein the CPU is further configured to:
divide the sound part of the moving image into an utterance section and a non-utterance section, and
connect the first sound segment and the second sound segment that are extracted from the non-utterance section.

6. The information processing device according to claim 5, wherein the CPU is further configured to overlap an event sound on the connected first sound segment and the connected second sound segment.

7. The information processing device according to claim 1, wherein the CPU is further configured to apply cross-fade to overlapping parts of the first sound segment and the second sound segment.

8. The information processing device according to claim 1, wherein the CPU is further configured to generate the shortened sound based on a video analysis result of the video part of the moving image.

9. The information processing device according to claim 8, wherein the CPU is further configured to dispose the plurality of sound segments at positions at which a time-series change of volume of the plurality of sound segments matches a time-series change of a subject appearing in the fast reproduction video.

10. The information processing device according to claim 1, wherein the CPU is further configured to control a reproduction speed of the fast reproduction video based on a sound analysis result of the sound part of the moving image.

11. An information processing system, comprising:
a central processing unit (CPU) configured to:
generate a fast reproduction video from a video part of a moving image;
extract a plurality of sound segments from a portion of a sound part of the moving image;
dispose the plurality of sound segments at a position corresponding to the fast reproduction video;
connect a first sound segment of the plurality of sound segments and a second sound segment of the plurality of sound segments in an overlapping manner;
generate a shortened sound based on the connection of the first sound segment and the second sound segment; and
synthesize the generated fast reproduction video and the generated shortened sound to generate a fast reproduction moving image.

12. An information processing method, comprising:
in an information processing device comprising a central processing unit (CPU):
generating, by the CPU, a fast reproduction video from a video part of a moving image;
extracting, by the CPU, a plurality of sound segments from a portion of a sound part of the moving image;
disposing, by the CPU, the plurality of sound segments at a position corresponding to the fast reproduction video;
connecting, by the CPU, a first sound segment of the plurality of sound segments and a second sound segment of the plurality of sound segments in an overlapping manner;
generating, by the CPU, a shortened sound based on the connection of the first sound segment and the second sound segment; and
synthesizing, by the CPU, the generated fast reproduction video and the shortened sound for generating a fast reproduction moving image.

13. A non-transitory computer-readable medium having stored thereon computer-executable instructions which, when executed by an information processing device, cause the information processing device to execute operations, the operations comprising:

generating a fast reproduction video from a video part of a moving image;

extracting a plurality of sound segments from a portion of a sound part of the moving image;

disposing the plurality of sound segments at a position corresponding to the fast reproduction video;

connecting a first sound segment of the plurality of sound segments and a second sound segment of the plurality of sound segments in an overlapping manner;

generating a shortened sound based on the connection of the first sound segment and the second sound segment; and synthesizing the generated fast reproduction video and the generated shortened sound to generate a fast reproduction moving image.

* * * * *